United States Patent
Fukuda

(10) Patent No.: US 12,228,790 B2
(45) Date of Patent: Feb. 18, 2025

(54) IMAGE PROCESSING METHOD, IMAGE PROCESSING DEVICE, AND IMAGE PICKUP APPARATUS

(71) Applicant: CANON KABUSHIKI KAISHA, Tokyo (JP)

(72) Inventor: Koichi Fukuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/570,426

(22) Filed: Jan. 7, 2022

(65) Prior Publication Data

US 2022/0137328 A1    May 5, 2022

Related U.S. Application Data

(62) Division of application No. 16/731,247, filed on Dec. 31, 2019, now abandoned, which is a division of
(Continued)

(30) Foreign Application Priority Data

| Mar. 10, 2015 | (JP) | 2015-047460 |
| Mar. 2, 2016 | (JP) | 2016-039594 |
| Mar. 9, 2016 | (JP) | 2016-045216 |

(51) Int. Cl.
*H04N 23/67* (2023.01)
*G02B 7/34* (2021.01)
(Continued)

(52) U.S. Cl.
CPC ............. *G02B 7/34* (2013.01); *G02B 7/36* (2013.01); *G06T 5/50* (2013.01); *G06T 5/70* (2024.01);
(Continued)

(58) Field of Classification Search
CPC .. G02B 7/34; G02B 7/36; G03B 13/36; G06T 2207/10024; G06T 2207/10052;
(Continued)

(56) References Cited

U.S. PATENT DOCUMENTS

| 4,410,804 A | 10/1983 | Stauffer |
| 5,612,763 A * | 3/1997 | Uchiyama ............... G02B 7/28 396/126 |

(Continued)

FOREIGN PATENT DOCUMENTS

| CN | 102472881 A | 5/2012 |
| CN | 102812712 A | 12/2012 |

(Continued)

OTHER PUBLICATIONS

Aug. 27, 2019 Chinese Official Action in Chinese Patent Appln. No. 201680012952.2.
(Continued)

*Primary Examiner* — Ian L Lemieux
(74) *Attorney, Agent, or Firm* — Venable LLP

(57) ABSTRACT

One embodiment of the present invention provides an image processing method, the method comprising: acquiring a plurality of viewpoint images; generating a contrast distribution from the plurality of viewpoint images; and generating an output image by performing image processing in accordance with the contrast distribution with respect to an image based on the plurality of viewpoint images.

39 Claims, 26 Drawing Sheets

Related U.S. Application Data application No. 15/545,050, filed as application No. PCT/JP2016/058419 on Mar. 10, 2016, now Pat. No. 10,545,311.

(51) Int. Cl.

| | |
|---|---|
| *G02B 7/36* | (2021.01) |
| *G06T 5/50* | (2006.01) |
| *G06T 5/70* | (2024.01) |
| *G06T 5/73* | (2024.01) |
| *G03B 13/36* | (2021.01) |

(52) U.S. Cl.
CPC ............ *G06T 5/73* (2024.01); *H04N 23/673* (2023.01); *G03B 13/36* (2013.01); *G06T 2207/10024* (2013.01); *G06T 2207/10052* (2013.01); *G06T 2207/20221* (2013.01); *G06T 2207/30201* (2013.01)

(58) Field of Classification Search
CPC . G06T 2207/20221; G06T 2207/30201; G06T 5/002; G06T 5/003; G06T 5/50; H04N 23/673

See application file for complete search history.

(56) References Cited

U.S. PATENT DOCUMENTS

| | | | |
|---|---|---|---|
| 5,640,618 A * | 6/1997 | Uchiyama | G02B 7/28 |
| | | | 396/128 |
| 7,068,328 B1 | 6/2006 | Mino | |
| 7,751,757 B2 | 7/2010 | Kim et al. | |
| 8,619,082 B1 | 12/2013 | Ciurea et al. | |
| 8,730,374 B2 | 5/2014 | Sugawara | |
| 8,749,660 B2 | 6/2014 | Yahagi et al. | |
| 8,773,549 B2 | 7/2014 | Fukuda | |
| 8,842,201 B2 | 9/2014 | Tajiri | |
| 8,885,026 B2 | 11/2014 | Endo | |
| 9,167,224 B2 | 10/2015 | Izawa | |
| 9,247,227 B2 | 1/2016 | Izawa | |
| 9,392,257 B2 | 7/2016 | Nagumo et al. | |
| 9,426,349 B2 | 8/2016 | Fukuda | |
| 9,438,786 B2 | 9/2016 | Fukuda | |
| 9,462,177 B2 | 10/2016 | Fukuda | |
| 9,497,374 B2 * | 11/2016 | Kusaka | H04N 25/702 |
| 9,894,252 B2 | 2/2018 | Hiasa | |
| 10,009,533 B2 | 6/2018 | Kimura et al. | |
| 10,424,049 B2 | 9/2019 | Nagumo et al. | |
| 2005/0191047 A1 * | 9/2005 | Toji | H04N 23/672 |
| | | | 396/125 |
| 2012/0092545 A1 | 4/2012 | Sugawara | |
| 2012/0249550 A1 | 10/2012 | Akeley | |
| 2013/0016256 A1 | 1/2013 | Yahagi et al. | |
| 2013/0050420 A1 | 2/2013 | Chen et al. | |
| 2013/0135448 A1 | 5/2013 | Nagumo et al. | |
| 2013/0222633 A1 | 8/2013 | Knight et al. | |
| 2013/0314510 A1 | 11/2013 | Endo | |
| 2014/0071313 A1 | 3/2014 | Hiasa | |
| 2014/0192220 A1 | 7/2014 | Kimura et al. | |
| 2014/0210963 A1 | 7/2014 | Tanaka et al. | |
| 2014/0211076 A1 | 7/2014 | Inoue et al. | |
| 2014/0368683 A1 | 12/2014 | Venkataraman et al. | |
| 2015/0009299 A1 | 1/2015 | Izawa | |
| 2015/0156430 A1 | 6/2015 | Ishiga | |
| 2015/0178595 A1 | 6/2015 | Sawada et al. | |
| 2015/0185585 A1 | 7/2015 | Kawai | |
| 2015/0245007 A1 | 8/2015 | Hyodo | |
| 2016/0044252 A1 | 2/2016 | Molina | |
| 2016/0255266 A1 * | 9/2016 | Nakagata | H04N 23/67 |
| | | | 348/241 |
| 2017/0154408 A1 | 6/2017 | Jobara et al. | |
| 2017/0272643 A1 | 9/2017 | Tamaki et al. | |
| 2017/0302903 A1 | 10/2017 | Ng et al. | |
| 2018/0013951 A1 | 1/2018 | Fukuda | |

FOREIGN PATENT DOCUMENTS

| | | |
|---|---|---|
| CN | 103037236 A | 4/2013 |
| CN | 103139587 A | 6/2013 |
| CN | 103685922 A | 3/2014 |
| CN | 103733106 A | 4/2014 |
| CN | 103828363 A | 5/2014 |
| CN | 104221370 A | 12/2014 |
| EP | 2475162 A2 | 7/2012 |
| EP | 1 085 751 B1 | 11/2012 |
| JP | 2001-083407 A | 3/2001 |
| JP | 2002-077622 A | 3/2002 |
| JP | 2003-209858 A | 7/2003 |
| JP | 2008015754 A * | 1/2008 |
| JP | 2010-206722 A | 9/2010 |
| JP | 2011-022796 A | 2/2011 |
| JP | 2013-026666 A | 2/2013 |
| JP | 2014-219549 A | 11/2014 |
| JP | 2014-228586 A | 12/2014 |
| KR | 10-2007-0117424 A | 12/2007 |
| WO | 2014/046039 A1 | 3/2014 |

OTHER PUBLICATIONS

Aaron Isaksen, et al., "Dynamically Reparameterized Light Fields," Proceedings of the 27th Annual Conference on Computer Graphics and Interactive Techniques, 2000, pp. 297-306.

May 31, 2016 International Search Report and Written Opinion in Int'l Appln. No. PCT/JP2016/058419.

Jun. 27, 2018 Korean Official Action in Korean Patent Appln. No. 10-2017-7024777.

Todor Georgiev, et al., "Focused Plenoptic Camera and Rendering," Journal of Electronic Imaging, Apr. 1, 2010, pp. 1-28.

Oct. 18, 2018 European Search Report in European Patent Appln. No. 16761877.6.

Anonymous, "Lytro—Wikipedia," Oct. 25, 2014.

Michael Tao, et al., "Depth from Combining Defocus and Correspondence Using Light-Field Cameras," 2013 IEEE International Conference on Computer Vision, Dec. 1, 2013, pp. 673-680.

Donghyeon Cho, et al., "Modeling the Calibration Pipeline of the Lytro Camera for High Quality Light-Field Image Reconstruction," 2013 IEEE International Conference on Computer Vision, Dec. 1, 2013, pp. 3280-3287.

May 12, 2020 European Search Report in European Patent Appln. No. 19215526.5.

Mar. 1, 2022 Office Action in Chinese Patent Application No. 202011073254.8 (with English translation).

Mar. 28, 2022 Office Action in European Patent Application No. 19 215 526.5.

D. Soukup, et al., "Depth Estimation within a Multi-Line-Scan Light-Field Framework," 18th International Conference Lecture Notes in Computer Science, Dec. 8, 2014, pp. 471-481.

May 23, 2024 European Official Action in European Patent Appln. No. 23216664.5.

* cited by examiner

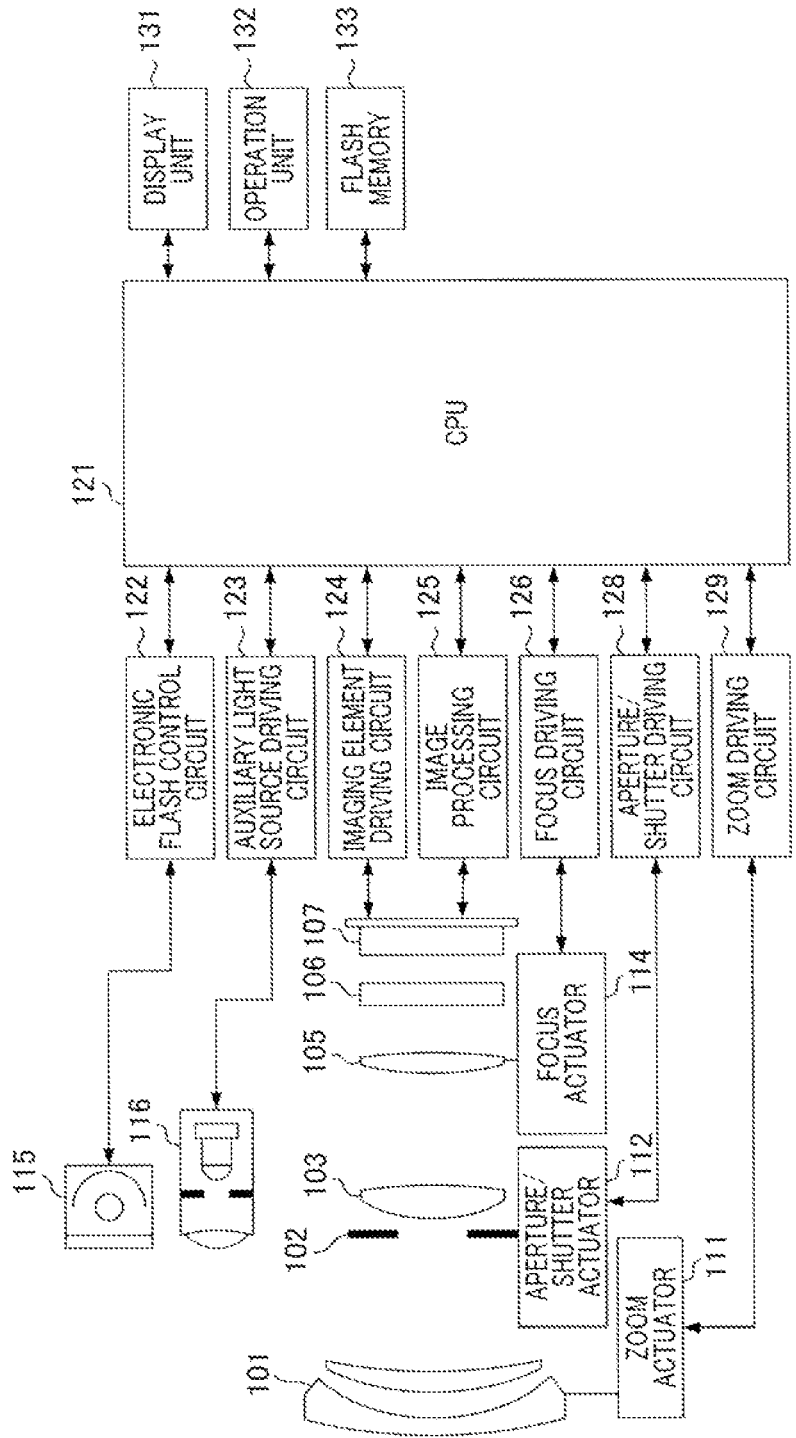
[Fig. 1]

[Fig. 2]
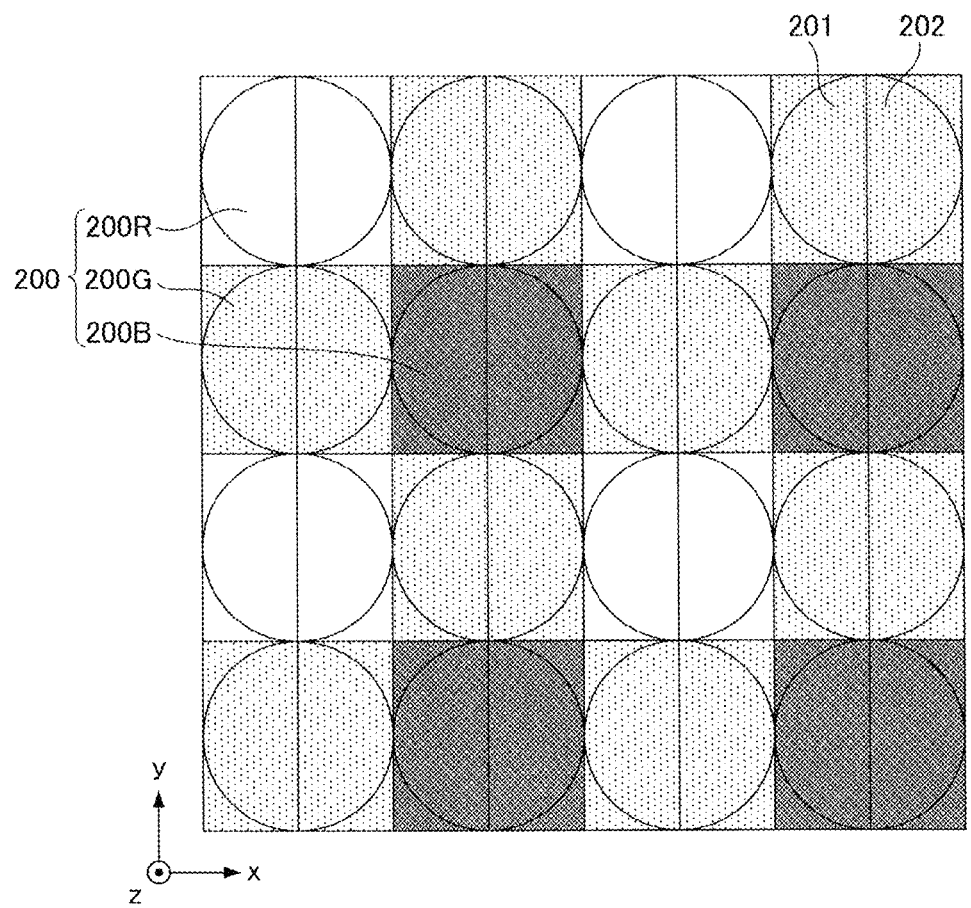

[Fig. 3A]
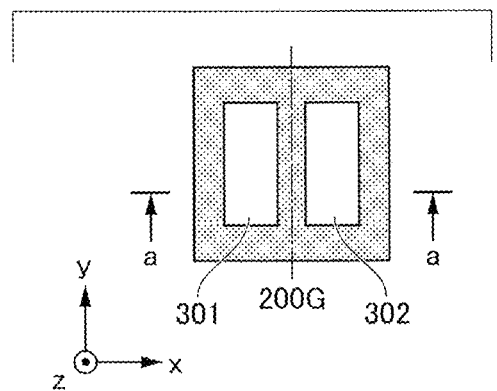
[Fig. 3B]
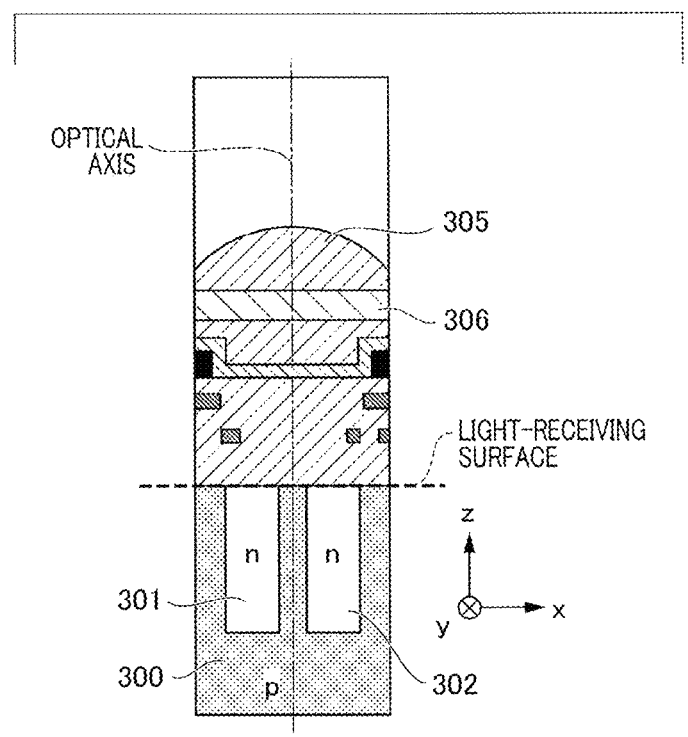

[Fig. 4]
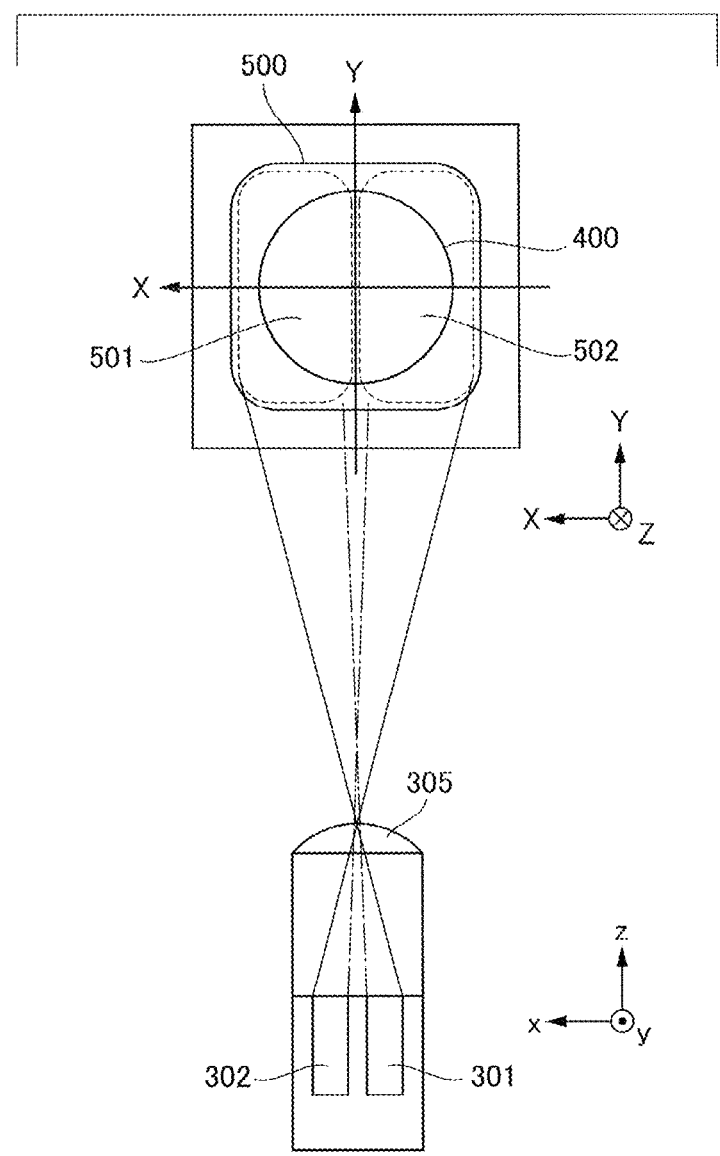

[Fig. 5A]
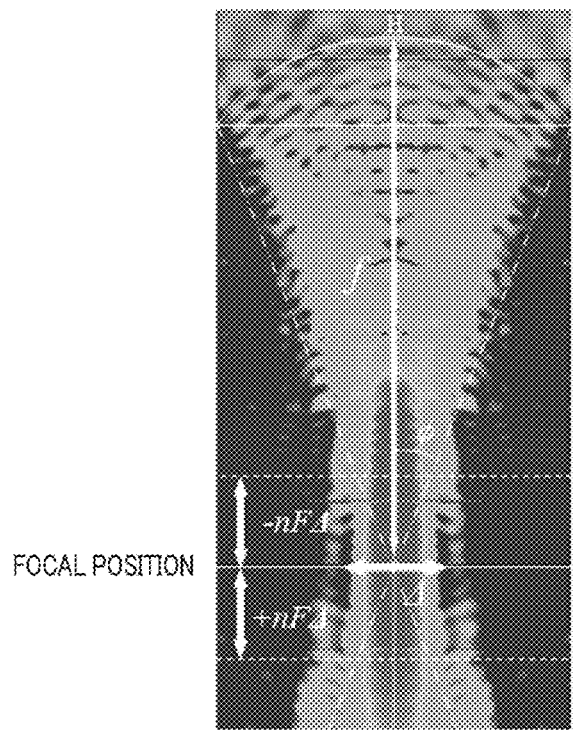
[Fig. 5B]
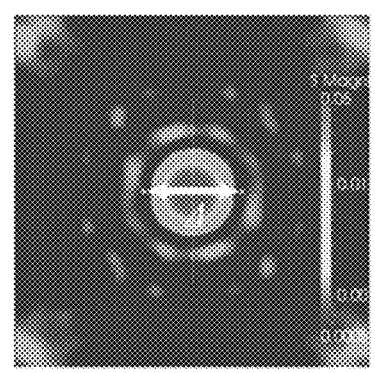

[Fig. 6]
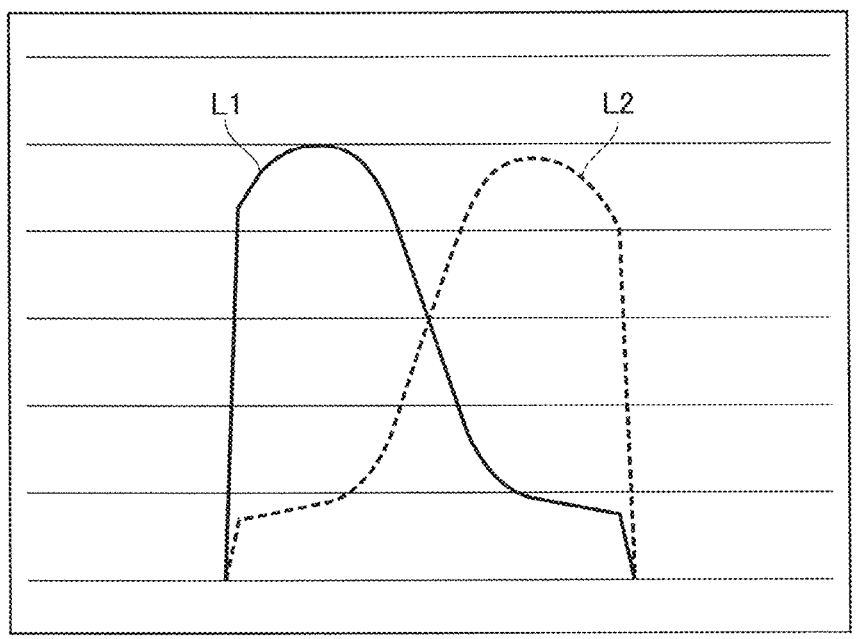

[Fig. 7]
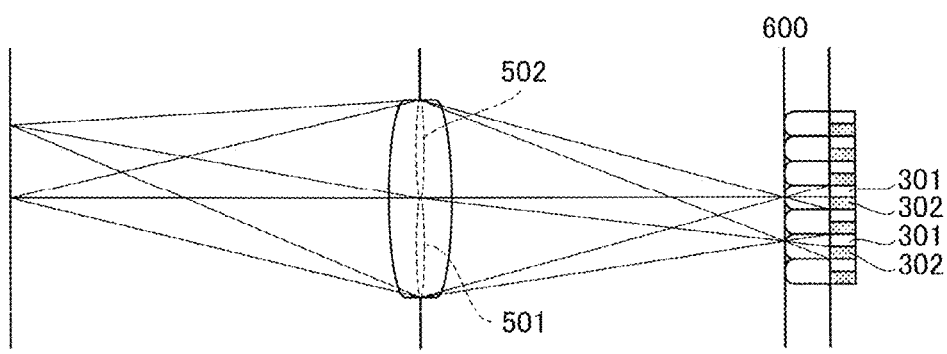
[Fig. 8]
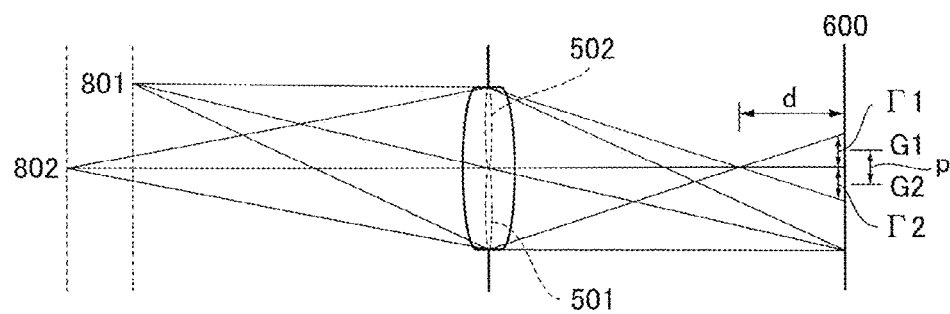

[Fig. 9]
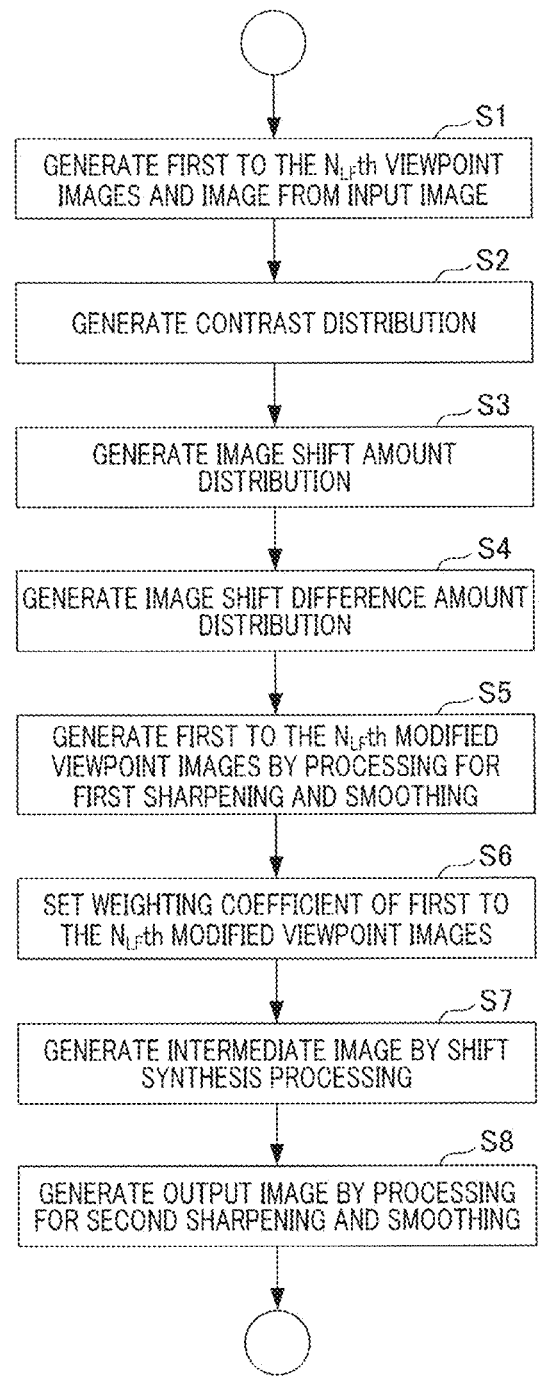

[Fig. 10A]
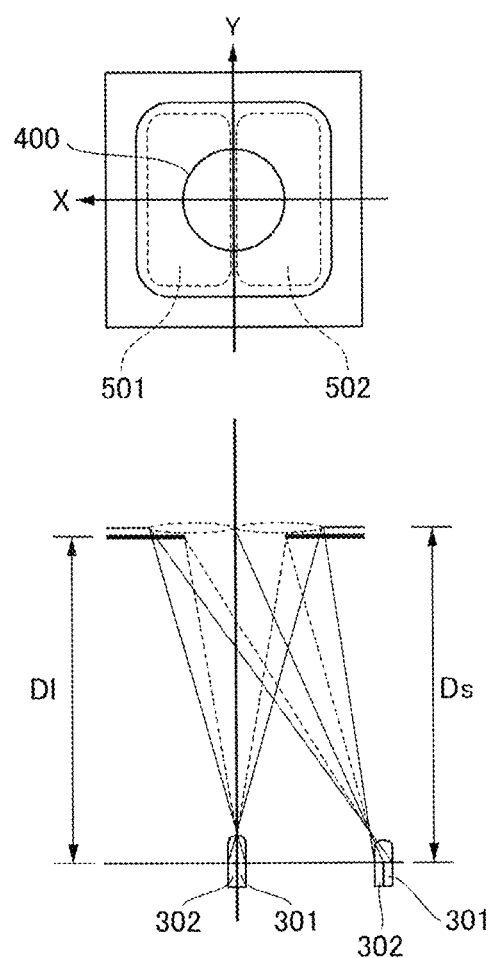

[Fig. 10B]
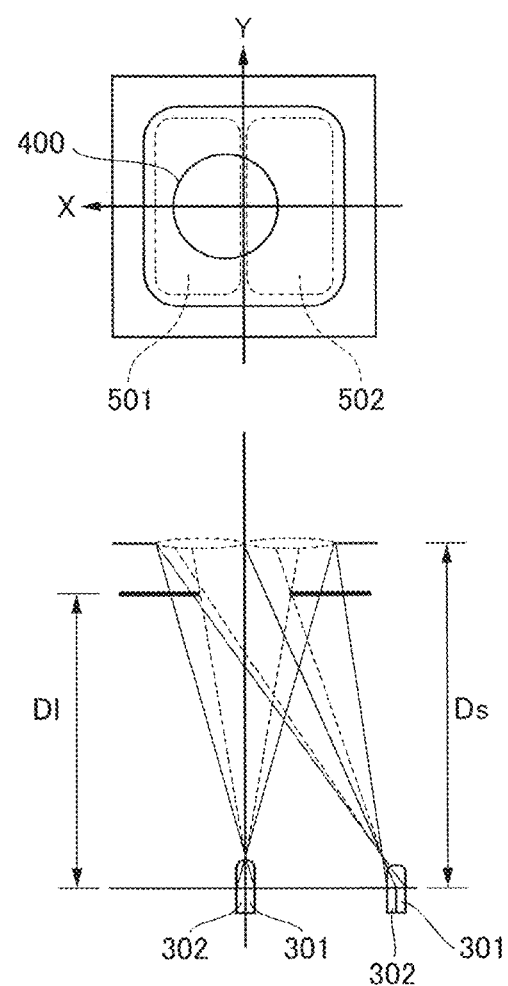

[Fig. 10C]
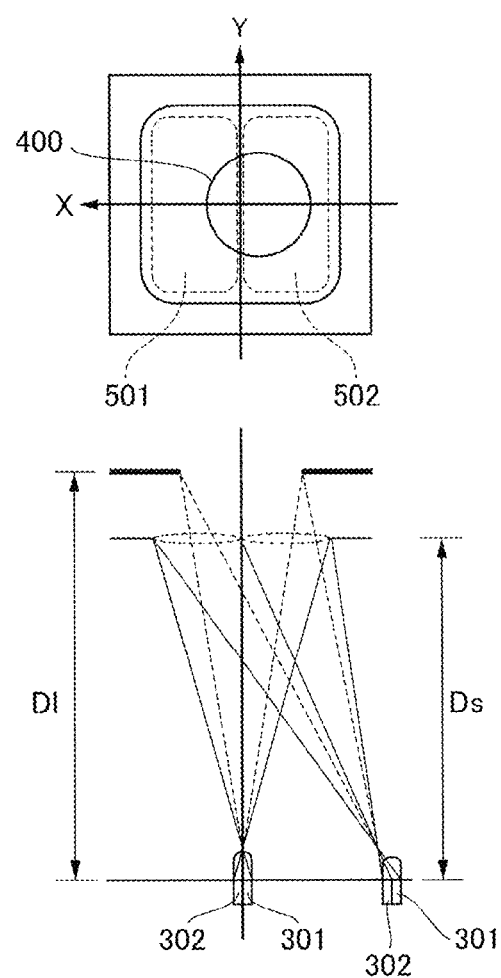

[Fig. 11]
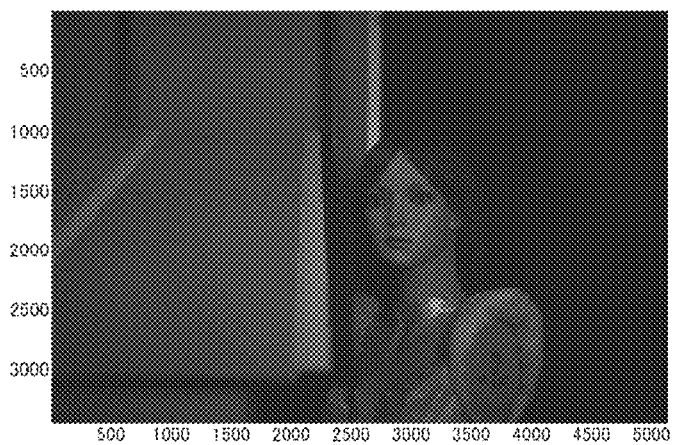
[Fig. 12]
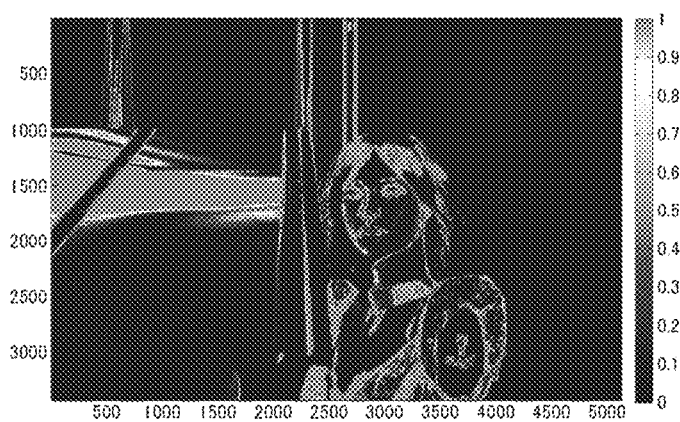

[Fig. 13]
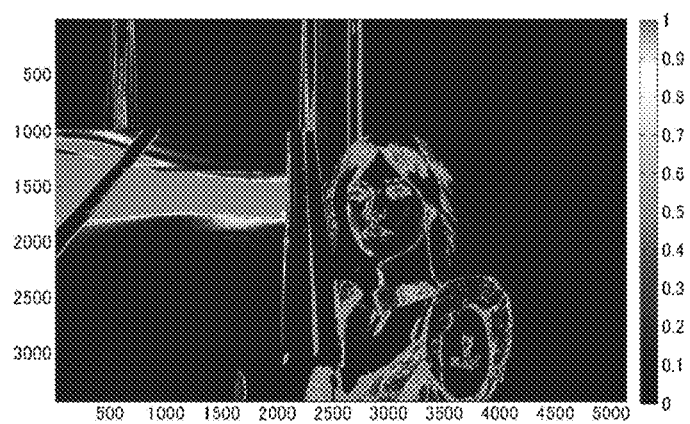
[Fig. 14]
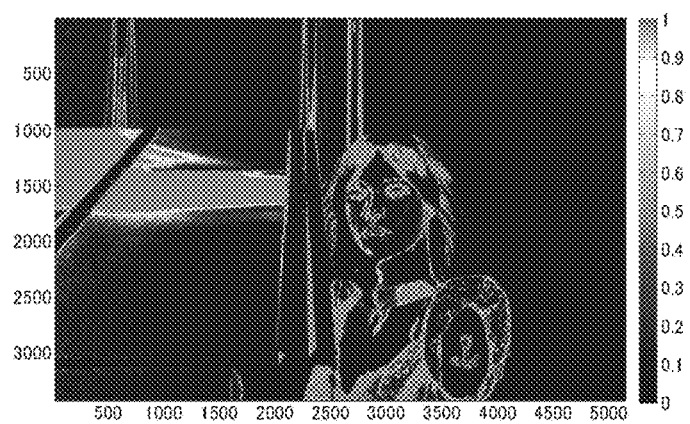

[Fig. 15A]
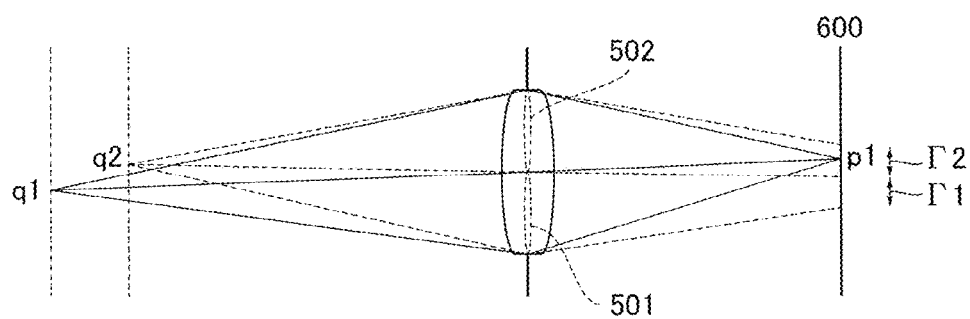
[Fig. 15B]
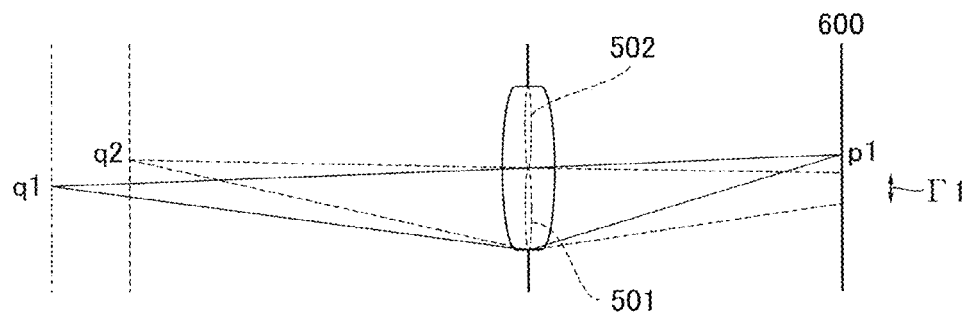

[Fig. 15C]
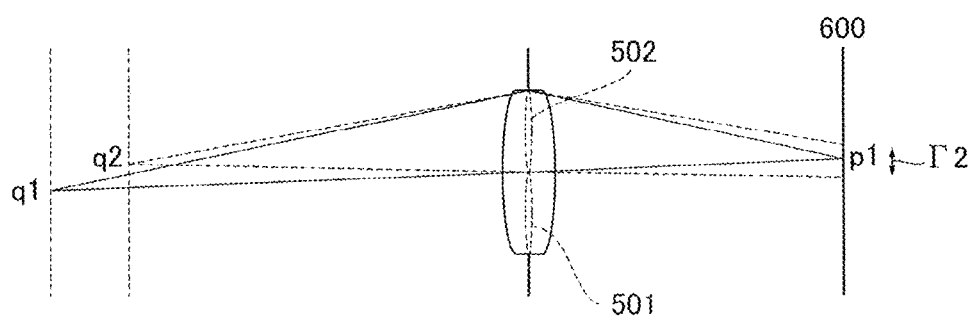
[Fig. 16]
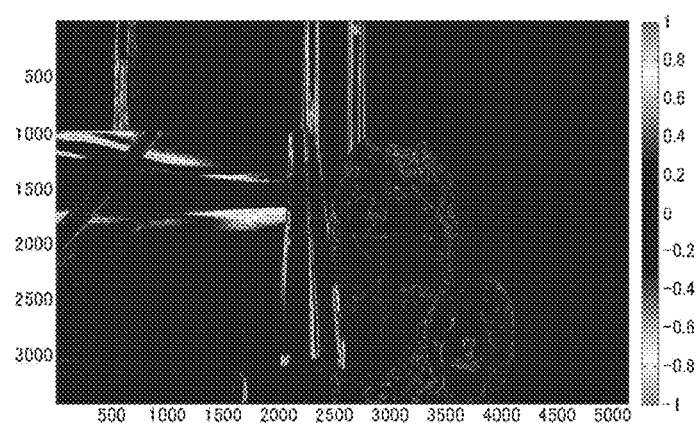

[Fig. 17]
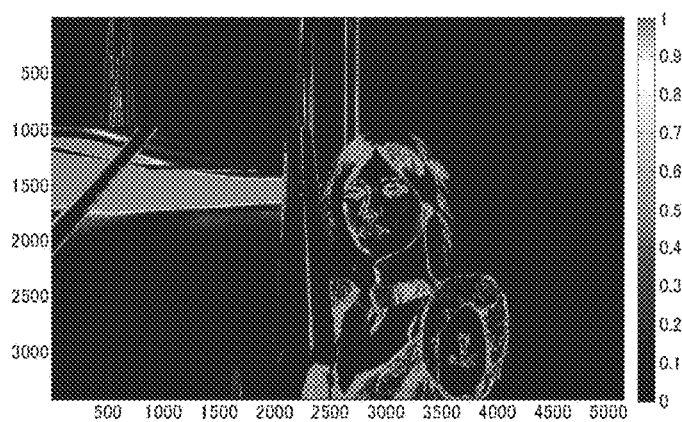
[Fig. 18]
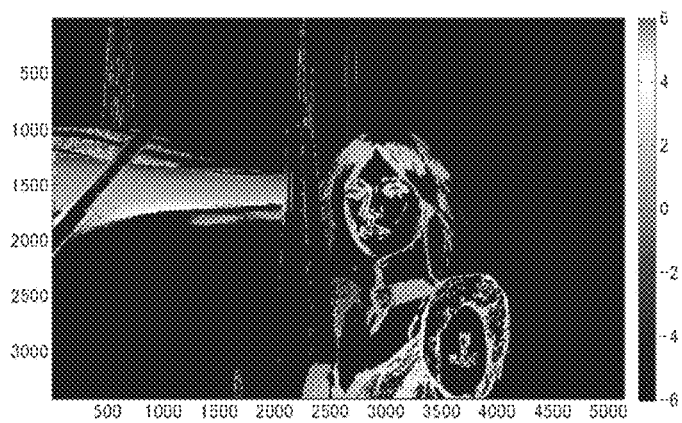

[Fig. 19]
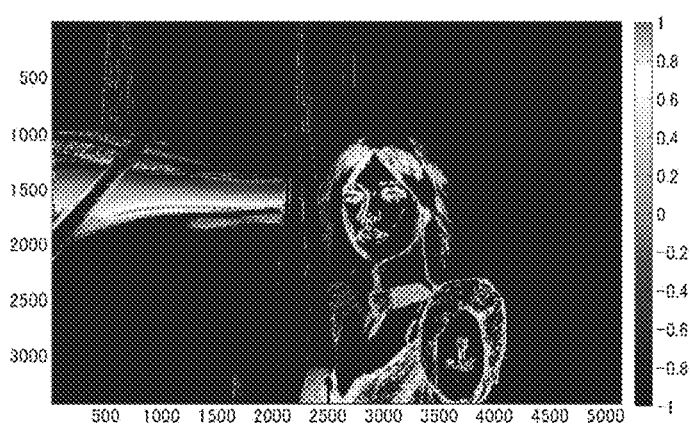

[Fig. 20]
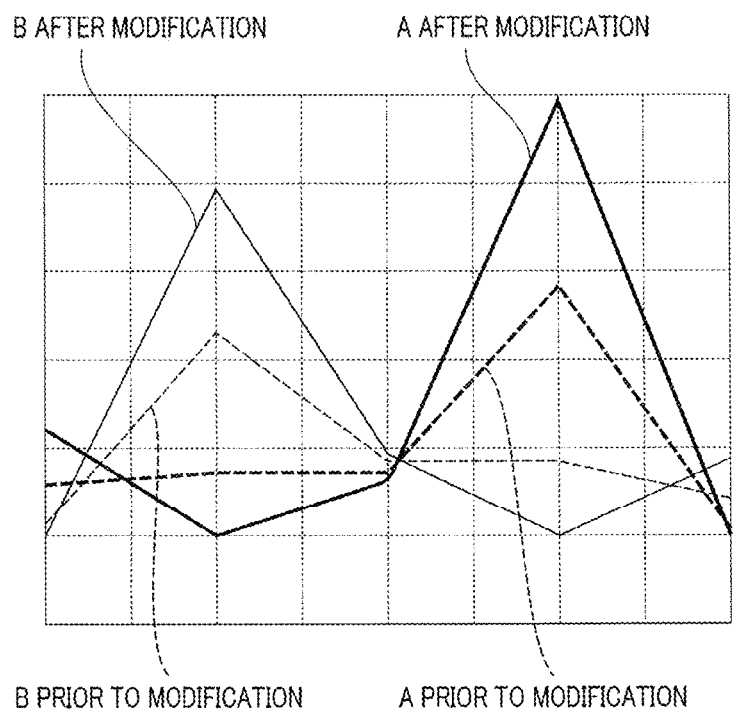

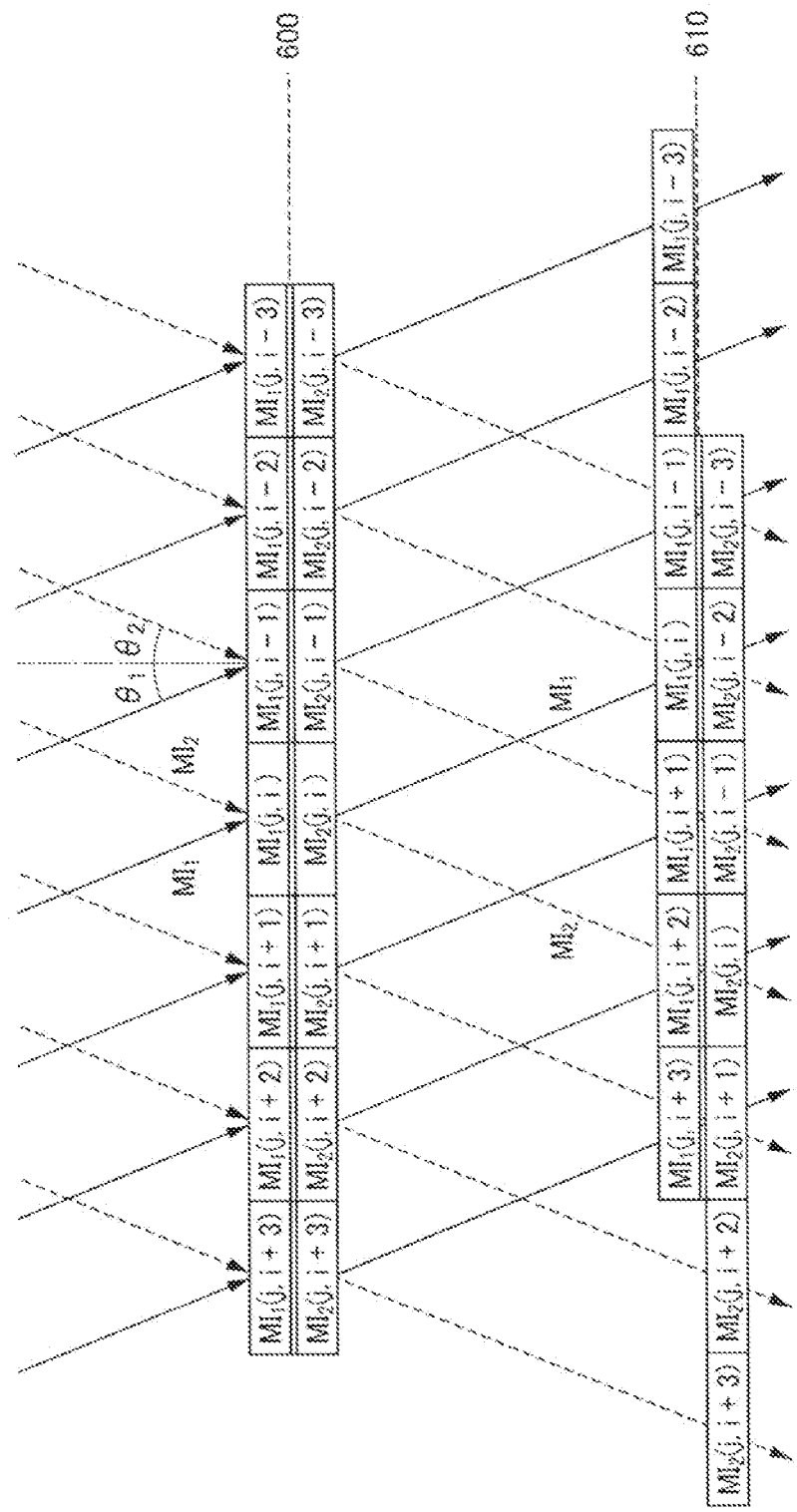
[Fig. 21]

[Fig. 22]
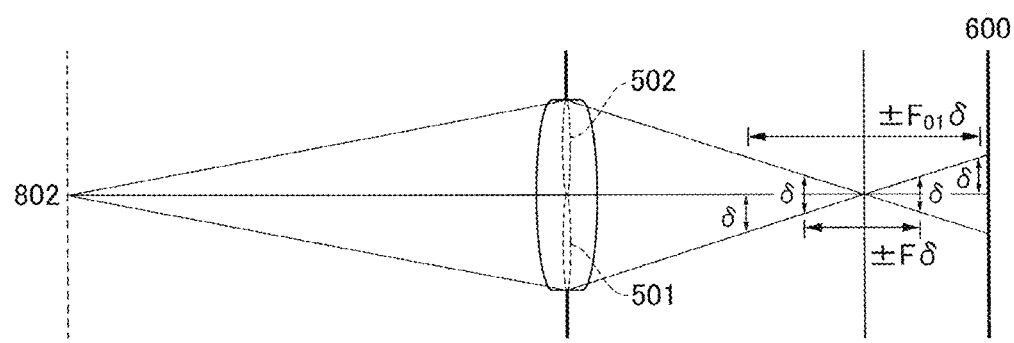

[Fig. 23A]

[Fig. 23B]
[Fig. 24A]

[Fig. 24B]
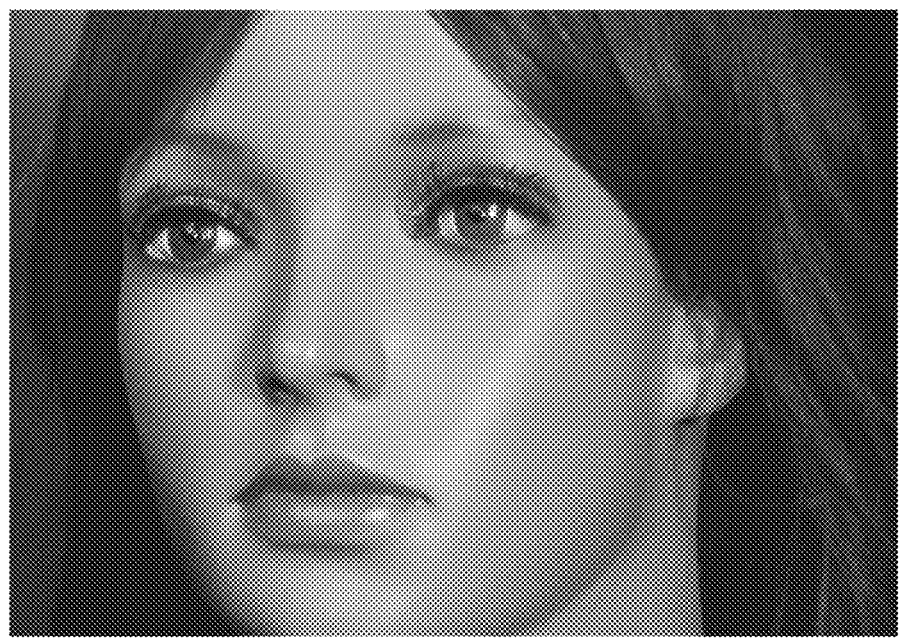

[Fig. 25]
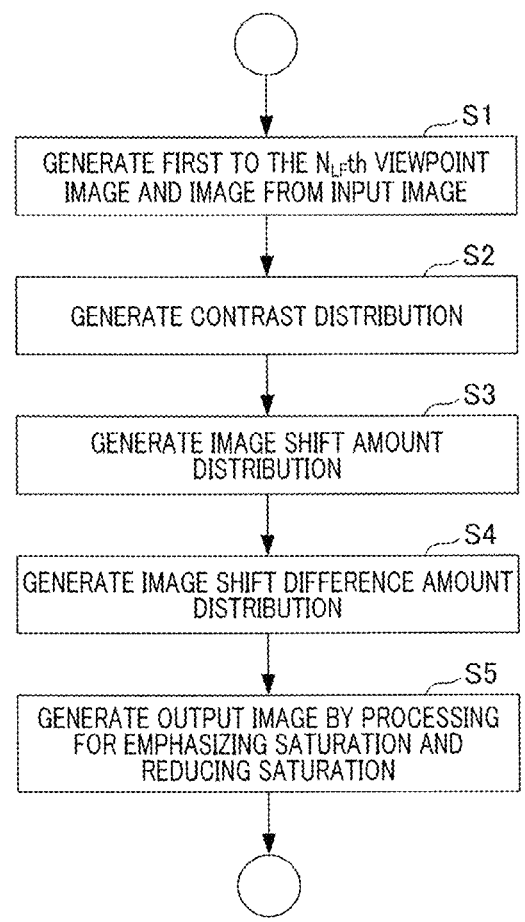

[Fig. 26]
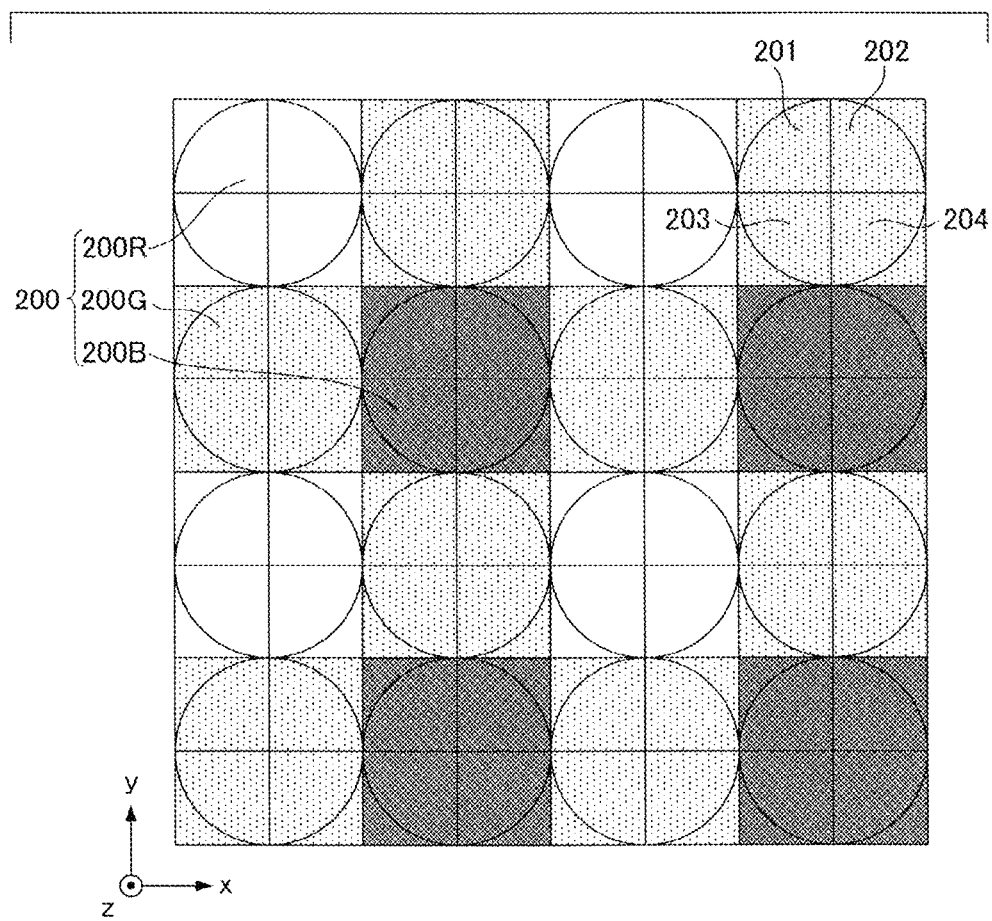

[Fig. 27A]
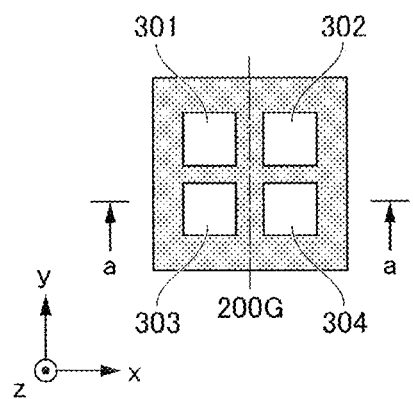
[Fig. 27B]
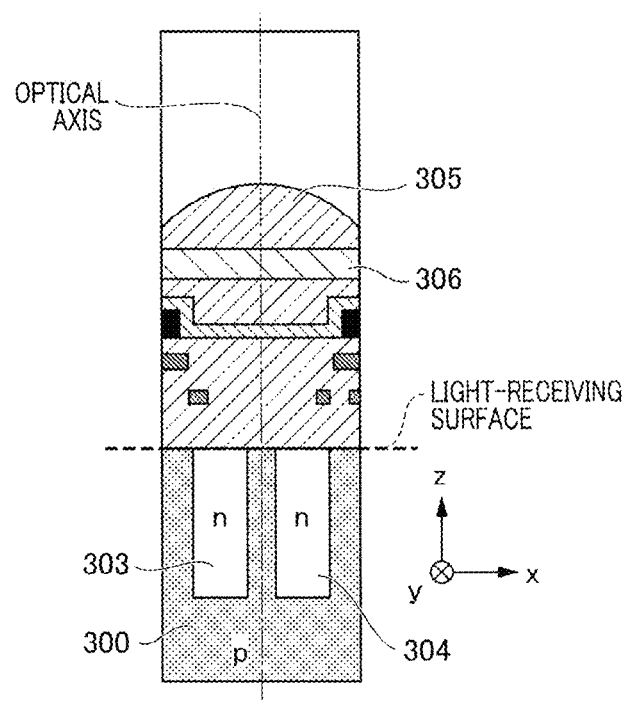

ND IMAGE
IMAGE PROCESSING METHOD, IMAGE PROCESSING DEVICE, AND IMAGE PICKUP APPARATUS

This application is a divisional of U.S. patent application Ser. No. 16/731,247 filed Dec. 31, 2019, which is a divisional of U.S. patent application Ser. No. 15/545,050 filed Jul. 20, 2017, U.S. Pat. No. 10,545,311 B2, which was the National Stage of International Patent Appln. No. PCT/JP2016/058419 filed Mar. 10, 2016.

TECHNICAL FIELD

The present invention relates to image processing for a plurality of viewpoint images corresponding to a plurality of viewpoints, acquired by an imaging element.

BACKGROUND ART

One focus detection method performed by an image pickup apparatus is an imaging plane phase-difference type method that detects a focus as a phase-difference type using focus detecting pixels formed in an imaging element. The image pickup apparatus disclosed in Patent Literature 1 uses a single microlens and a two-dimensional imaging element that forms a photoelectric conversion unit divided into a plurality of parts, with respect to one pixel. The photoelectric conversion unit divided into the plurality of parts is configured to receive light in areas with different exit pupils of a photographing lens though the single microlens, and performs pupil division. The focus detection is performed as the imaging plane phase-difference type by generating a viewpoint signal derived from the light respectively received by the photoelectric conversion unit divided into the plurality of parts, and calculating an image shift amount from a parallax between a plurality of viewpoint signals, and converting the result to a defocus amount. Patent Literature 2 discloses a method for generating an imaging signal by summing a plurality of viewpoint signals received by a photoelectric conversion unit divided into a plurality of parts.

The plurality of viewpoint signals with respect to the photographed image is equivalent to Light Field data that is information about the spatial distribution and the angle distribution of light intensity. Non-patent Literature 1 discloses a refocus technique that synthesizes an image in a virtual imaging surface different from a imaging plane with the acquired Light Field data, and alters an in-focus position of an image after photographing.

CITATION LIST

Patent Literature

Patent Literature 1: U.S. Pat. No. 4,410,804
Patent Literature 2: Japanese Patent Laid-Open No. 2001-083407

Non-Patent Literature

SIGGPAPH '00 Proceedings of the 27th Annual Conference on Computer graphics and Interactive Techniques, p 297-306(2000)

However, perspective conflict and occlusion are likely to be caused, and the quality of the image may be reduced when image processing such as sharpening and smoothing in refocus processing is performed in the area in which a plurality of object images with significantly different defocus states and configurations of spatial frequency are photographed.

The present invention enables performing image processing, while successfully maintaining the quality of the image.

SUMMARY OF INVENTION

One embodiment of the present invention provides an image processing method, the method comprising: acquiring a plurality of viewpoint images; generating a contrast distribution from the plurality of viewpoint images; and generating an output image by performing image processing in accordance with the contrast distribution with respect to an image based on the plurality of viewpoint images.

Further features of the present invention will become apparent from the following description of exemplary embodiments with reference to the attached drawings.

BRIEF DESCRIPTION OF DRAWINGS

FIG. 1 is a diagram schematically illustrating a configuration of an image pickup apparatus applied to an image processing method according to a first embodiment of the present invention.

FIG. 2 is a diagram schematically illustrating a pixel array in the first embodiment of the present invention.

FIG. 3A illustrates a schematic plane diagram (A) for the pixel in the first embodiment of the present invention.

FIG. 3B illustrates a schematic cross sectional diagram (B) for the pixel in the first embodiment of the present invention.

FIG. 4 is a diagram schematically illustrating the pixel and pupil division in the first embodiment of the present invention.

FIG. 5A is a diagram illustrating an exemplary light intensity distribution within the pixel in the first embodiment of the present invention.

FIG. 5B is a diagram illustrating an exemplary light intensity distribution within the pixel in the first embodiment of the present invention.

FIG. 6 is a diagram illustrating a pupil intensity distribution in the first embodiment of the present invention.

FIG. 7 is a diagram schematically illustrating an imaging element and the pupil division in the first embodiment of the present invention.

FIG. 8 is a diagram schematically illustrating a relationship between defocus amounts of a first viewpoint image and a second viewpoint image, and an image shift amount therebetween in the first embodiment of the present invention.

FIG. 9 is a diagram illustrating an exemplary flowchart of refocus processing in the first embodiment of the present invention.

FIG. 10A is a diagram illustrating shading due to a pupil shift between the first viewpoint image and the second viewpoint image in the first embodiment of the present invention.

FIG. 10B is a diagram illustrating shading due to a pupil shift between the first viewpoint image and the second viewpoint image in the first embodiment of the present invention.

FIG. 10C is a diagram illustrating shading due to a pupil shift between the first viewpoint image and the second viewpoint image in the first embodiment of the present invention.

FIG. 11 is a diagram illustrating an image in the first embodiment of the present invention.

FIG. 12 is a diagram illustrating an image contrast distribution of the image in the first embodiment of the present invention.

FIG. 13 is a diagram illustrating a first viewpoint contrast distribution of the first viewpoint image in the first embodiment of the present invention.

FIG. 14 is a diagram illustrating a second viewpoint contrast distribution of the second viewpoint image in the first embodiment of the present invention.

FIG. 15A is a diagram schematically illustrating a relationship of a parallax and perspective conflict between the viewpoint images in the first embodiment of the present invention.

FIG. 15B is a diagram schematically illustrating a relationship of a parallax and perspective conflict between the viewpoint images in the first embodiment of the present invention.

FIG. 15C is a diagram schematically illustrating a relationship of a parallax and perspective conflict between the viewpoint images in the first embodiment of the present invention.

FIG. 16 is a diagram illustrating a contrast difference amount distribution between the first viewpoint image and the second viewpoint image in the first embodiment of the present invention.

FIG. 17 is a diagram illustrating a contrast distribution generated from the image, the first viewpoint image, and the second viewpoint image in the first embodiment of the present invention.

FIG. 18 is a diagram illustrating an image shift amount distribution of the first viewpoint image and the second viewpoint image in the first embodiment of the present invention.

FIG. 19 is a diagram illustrating an image shift difference amount distribution from a predetermined shift amount in the first embodiment of the present invention.

FIG. 20 is a diagram illustrating exemplary processing for sharpening the parallax between the viewpoint images (crosstalk correction) in the first embodiment of the present invention.

FIG. 21 is a diagram schematically illustrating a refocus by shift synthesis processing in the first embodiment of the present invention.

FIG. 22 is a diagram schematically illustrating a refocusable range by the shift synthesis processing in the first embodiment of the present invention.

FIG. 23A illustrates an exemplary refocused image by the shift synthesis processing of the first viewpoint image and the second viewpoint image prior to the sharpening in the prior art.

FIG. 23B illustrates an exemplary refocused image by the shift synthesis processing of the first modified viewpoint image and the second modified viewpoint image after the sharpening in the first embodiment of the present invention.

FIG. 24A illustrates an exemplary image in the first embodiment of the present invention.

FIG. 24B illustrates a refocused image in the first embodiment of the present invention.

FIG. 25 is a diagram illustrating an exemplary flowchart of saturation processing in a second embodiment of the present invention.

FIG. 26 is a diagram schematically illustrating a pixel array in a third embodiment of the present invention.

FIG. 27A illustrates a schematic plane diagram in the third embodiment of the present invention.

FIG. 27B illustrates a schematic cross sectional diagram in the third embodiment of the present invention.

DESCRIPTION OF EMBODIMENTS

Hereinafter, preferred embodiments of the present invention will be described in detail with reference to the accompanying drawings. In the following embodiments, a description will be given of an embodiment applied to an image pickup apparatus such as a digital camera, however, an embodiment of the present invention can be widely applied to an image processing device, an electronic apparatus, and the like for carrying out an image processing method according to the present invention.

First Embodiment

Hereinafter, a description will be given of the whole configuration of a camera that is the image pickup apparatus applied to the image processing method according to a first embodiment of the present invention.

FIG. 1 is a block diagram illustrating an exemplary configuration of an image pickup apparatus with an imaging element according to an exemplary embodiment of the present invention. A first lens group 101, which is arranged at a distal end of an imaging optical system (focusing optical system), is held so as to be extendable and retractable in an optical axis direction in a lens barrel. An aperture shutter 102 adjusts its aperture diameter to adjust light quantity when shooting. The aperture shutter 102 also functions as a shutter for adjusting an exposure time when shooting a still image. The aperture shutter 102 and a second lens group 103 advance and retract together in the optical axis direction to achieve magnification-varying operation (zooming function) in synchronism with the reciprocal operation of the first lens group 101. A third lens group 105 is a focus lens for focusing by advancing and retracting in the optical axis direction. An optical low-pass filter 106 is an optical element for reducing the false color or moire of a shot image. An imaging element 107, for example, consists of a two-dimensional CMOS (Complementary Metal Oxide Semiconductor) photo sensor and its peripheral circuit, and is arranged on the imaging surface of the imaging optical system.

A zoom actuator 111 performs the magnification-varying operation by rotating a cam cylinder (not shown) to cause the first lens group 101 and the second lens group 103 to move in the optical axis direction. An aperture/shutter actuator 112 controls the aperture diameter of the aperture shutter 102 to adjust the light quantity in the shooting, and also controls the exposure time when shooting the still image. A focus actuator 114 performs focus adjustment operation by moving the third lens group 105 in the optical axis direction.

An electronic flash 115 is used to illuminate an object when shooting. The electronic flash 115 is preferably a flash illumination device using a xenon tube, but may also be an illumination device having a continuous emission LED (Light Emitting Diode). An AF (auto focus) auxiliary light source 116 projects an image of a mask having a predetermined aperture pattern to a field via a projection lens, thereby improving a focus detection capability for a low-brightness object or a low-contrast object.

A CPU (Central Processing Unit) 121 that constitutes a control unit of a camera main body has a central control function that carries out various types of control. The CPU 121 includes an arithmetic unit, a ROM (Read Only Memory), a RAM (Random Access Memory), an A (Analog)/D (digital) converter, a D/A converter, a communication interface circuit, and the like. The CPU 121 drives various circuits incorporated into the camera on the basis of a predetermined program stored in the ROM to execute a series of operations including AF control, shooting processing, image processing, record processing, and the like. Also, the CPU 121 has functions as a generating unit of the data according to the present invention, in other words, functions as a viewpoint image generating unit, a captured image generating unit, a contrast distribution generating unit, an image shift amount distribution generating unit, an output image generating unit.

An electronic flash control circuit 122 controls the ON operation of the electronic flash 115 in synchronism with the shooting operation in accordance with the control command of the CPU 121. An auxiliary light source driving circuit 123 controls ON operation of an AF auxiliary light source unit 116 in synchronism with the focus detection operation in accordance with the control command of the CPU 121. An imaging element driving circuit 124 controls the imaging operation of the imaging element 107, A/D-converts an acquired imaging signal, and transits the digital data to the CPU 121. According to the control command of the CPU 121, an image processing circuit 125 performs processes such as gamma conversion, color interpolation, JPEG (Joint Photographic Experts Group) compression, and the like for the image obtained by the imaging element 107.

A focus driving circuit 126 drives the focus actuator 114 on the basis of the focus detection result in accordance with the control command of the CPU 121, and moves the third lens group 105 in the optical axis direction, thereby adjusting the focus. An aperture/shutter driving circuit 128 drives the aperture/shutter actuator 112 in accordance with the control command of the CPU 121, whereby the aperture diameter of the aperture shutter 102 is controlled. A zoom driving circuit 129 drives the zoom actuator 111 depending on the zooming operation instruction by the photographer in accordance with the control command of the CPU 121.

A display unit 131 has a display device such as an LCD (Liquid Crystal Display) or the like, and displays information about the shooting mode of the camera, a preview image prior to the shooting, a confirmation image after the shooting, an in-focus state display image upon the focus detection, and the like. An operation unit 132 includes a power switch, a release (shooting trigger) switch, a zooming operation switch, a shooting mode selection switch, and the like as operation switches, and outputs an operation instruction signal to the CPU 121. A flash memory 133 is a storage medium that is removable from the camera main body and that stores a shot image data and the like. In an embodiment of the present invention, the plurality of viewpoint images and the synthesis image thereof synthesized in the imaging element 107 and the image processing circuit 125 are displayed and stored in the display unit 131 and the flash memory 133 as the image data photographed by the imaging element 107 and processed by the image processing circuit 125.

[Imaging Element]

FIG. 2 illustrates a schematic diagram of an array of a pixel and a sub pixel of an imaging element in an embodiment of the present invention. In FIG. 2, the x-direction is set in the left-right direction, and the y-direction is set in the vertical direction, and the z-direction is set in a direction vertical to both of the x-direction and the y-direction (vertical to the plane of the page). In FIG. 2, the x direction is set in the left-right direction (horizontal direction), the y direction (perpendicular direction) is set in the vertical direction, and the z direction (optical axis direction) is set in a direction perpendicular to both of the x direction and the y direction (a direction perpendicular to the plane of the page). In FIG. 2, The array of the pixel (imaging pixel) of the two-dimensional CMOS sensor (imaging element) in an embodiment of the present invention is illustrated as 4-column by 4-row range, and the array of the sub pixel is illustrated as 8-column by 4-row range.

In an embodiment of the present invention, in a 2-column by 2-row pixel group 200 illustrated in FIG. 2, a pixel 200R with spectral sensitivity of a first color R (red) is arrayed at the position in the upper left, a pixel 200G with spectral sensitivity of a second color G (green) is arrayed in the upper right and the lower left, and a pixel 200B with spectral sensitivity of a third color (blue) is arrayed in the lower right. Furthermore, each pixel is comprised of a plurality of sub pixels including a first sub pixel 201 and a second sub pixel 202 (the first sub pixel to the $N_L$th sub pixel) that are divided as the two parts in the x direction (Nx division) and one part in the y direction (Ny division), wherein the division number is two (division number $N_{LF}$=Nx=Ny). Each of the sub pixels has a function as the focus detecting pixel which outputs the focus detection signal.

In an example in FIG. 2, a plurality of pixels each of which is in 4-column by 4-row range (the sub pixel in 8-column by 4-row range) are arrayed in the surface such that the image (synthesis image) used in the display at the display unit 131, the storage in the flash memory 133, and the like, and the input image for generating a plurality of viewpoint images wherein the divided number is 2 ($N_{LF}$) can be acquired. In the imaging element of an embodiment of the present invention, a cycle of pixel P is set as 4 μm (micrometer), the number of the pixel N is set in 5,575-column by 3,725-row range=about 20,750,000 pixels. Also, the cycle of the row direction of sub pixel $P_s$ is set as 2 μm and the number of the sub pixel $N_s$ is set in 11,150-column by 3,725-row range (about 41,500,000 pixels).

FIG. 3A illustrates the single pixel 200G in the imaging element 107 as illustrated in FIG. 2, in a plane diagram as viewed from the light-receiving surface side (+z side) of the imaging element. The z-axis is set in a direction perpendicular to the plane of the page of FIG. 3A, and the near side is defined as the forward direction of the z axis. Also, the y-axis is set in a vertical direction perpendicular to the z-axis, the upper side is set as the forward direction of the y-axis, and the x-axis is set in the left-right direction perpendicular to both of the z-axis and the y-axis, and the right side is set as the forward direction of the x-axis. FIG. 3B illustrates a cross sectional diagram along an a-a cutting-plane line as viewed from the −y side of FIG. 3A.

As illustrated in FIG. 3A and FIG. 3B, in the pixel 200G, a microlens 305 for converging the incident light at the light-receiving surface side of each pixel (+z direction) is formed. In addition, a plurality of photoelectric conversion units comprised of a first photoelectric conversion unit 301 and a second photoelectric conversion unit 302 (the first photoelectric conversion unit to the $N_{LF}$th photoelectric conversion unit) that are divided as two parts in the x direction (Nx division) and one part in the y direction (Ny division), wherein the divided number is 2 ($N_{LF}$) are formed. The first photoelectric conversion unit 301 and the second photoelectric conversion unit 302 (the first photoelectric conversion unit to the $N_{LF}$th photoelectric conversion unit) respectively correspond to the first sub pixel 201 and the second sub pixel 202 (the first sub pixel to the $N_{LF}$th sub pixel).

The first photoelectric conversion unit 301 and the second photoelectric conversion unit 302 are two p-n junction photodiodes independent of each other, and are comprised of a p-type well layer 300, and a n-type layer 301 and a n-type layer 302 that are divided as two parts. As necessary, a configuration may be formed as photodiodes with a PIN structure in which an intrinsic layer is sandwiched therebetween. In each pixel, a color filter 306 is formed between a microlens 305, and the first photoelectric conversion unit 301 and the second photoelectric conversion unit 302. As necessary, the spectrum transmissivity of the color filter 306 may be changed, and every pixel, photoelectric conversion unit, or the like, and also, the color filter may be omitted.

Light incident to the pixel 200G is converged by the microlens 305, dispersed by the color filter 306, and then received by the first photoelectric conversion unit 301 and the second photoelectric conversion unit 302 respectively. In the first photoelectric conversion unit 301 and the second photoelectric conversion unit 302, an electron and a hole (positive hole) are generated through pair production according to the amount of the received light and separated by a depletion layer, and thereafter, electrons are accumulated. In contrast, the hole is discharged outside the imaging element through the p-type well layer connected to a constant voltage source (not shown). The electrons accumulated in the first photoelectric conversion unit 301 and the second photoelectric conversion unit 302 are transferred to a capacitance unit (FD) via a transfer gate and then converted into a voltage signal.

FIG. 4 is a diagram schematically illustrating a correspondence relationship between the pixel structure in the imaging element 107 and a pupil division. FIG. 4 illustrates the cutting plane cut in the a-a line in the pixel structure shown in FIG. 3A as a cross sectional diagram as viewed from the +y direction, and the exit pupil surface of the focusing optical system as viewed from the −z direction. In FIG. 4, the state of the x axis and the y axis is shown reversed to that shown in FIG. 3, so as to correspond to the coordinate axis of the exit pupil plane.

The imaging element 107 is arrayed close to the imaging surface of a photographing lens (focusing optical system), and the light flux from the object is passed though the exit pupil 400 of the focusing optical system and incident to each pixel. The surface in which the imaging element is arrayed is set as an imaging plane.

Respectively, a first partial pupil area 501 and a second partial pupil area 502 that are divided as 2×1 (the first partial pupil area to the $N_{LF}$th partial pupil area which are divided as Nx×Ny) have a substantial optical conjugating relationship with the light-receiving surface of the first photoelectric conversion unit 301 and the second photoelectric conversion unit 302 (the first photoelectric conversion unit 301 to the $N_{LF}$th photoelectric conversion unit) by the microlens, and each area is the pupil area capable of receiving the light in the first sub pixel 201 or the second sub pixel 202 (anyone of the first sub pixel to the $N_{LF}$th sub pixel). The first partial pupil area 501 of the first sub pixel 201 is biased to the +x side on the pupil plane and the second partial pupil area 502 of the second sub pixel 202 is biased to the −x side on the pupil plane.

Also, a pupil area 500 has a substantial optical conjugating relationship with the light receiving surface that combines all of the first photoelectric conversion unit 301 and the second photoelectric conversion unit 302 divided as 2×1 (the first photoelectric conversion unit to the $N_{LF}$th photoelectric conversion unit, which are divided as Nx×Ny) by the microlens, and is the pupil area capable of receiving the light all over the pixel 200G which combines all of the first sub pixel 201 and the second sub pixel 202 (the first sub pixel to the $N_{LF}$th sub pixel).

FIG. 5 illustrates a light intensity distribution when the light is incident to the microlens formed in each pixel. FIG. 5A illustrates the light intensity distribution in the cross section parallel to the optical axis of the microlens. FIG. 5B illustrates the light intensity distribution in the cross section perpendicular to the optical axis of the microlens at the focal position of the microlens. The incident light is condensed to the focal position by the microlens. However, due to the effect of the diffraction due to the wave nature of the light, a diameter of a condensed light spot cannot become smaller than the diffraction limit Δ to cause the diameter to be finite. The size of the light-receiving surface of the photoelectric conversion unit is around 1-2 μm, while the condensed light spot of the microlens is around 1 μm. Therefore, due to the diffraction blur, the pupil division is not clearly performed in the first partial pupil area 501 and the second partial pupil area 502 that have the conjugating relationship with the light-receiving surface of the photoelectric conversion unit via the microlens in FIG. 4 to generate the light-receiving ratio distribution (pupil intensity distribution) depending on the incident angle of the light.

FIG. 6 illustrates an exemplary light-receiving ratio distribution (pupil intensity distribution) depending on the incident angle of the light. The horizontal axis represents the pupil coordinate system, and the vertical axis represents the light-receiving ratio. A graph line L1 illustrated as a solid line in FIG. 6 represents the pupil intensity distribution along the X axis of the first partial pupil area 501 in FIG. 4. The light-receiving ratio illustrated as the graph line L1 rises precipitously from the left end, achieves a peak, and then gradually falls, the change rate becomes slower, and L1 arrives at the right end. Also, a graph line L2 illustrated as a dashed line in FIG. 6 represents the pupil intensity distribution along the X axis of the second partial pupil area 502. The light-receiving ratio illustrated as the graph line L2 rises rapidly from the right end, achieves a peak, and then gradually falls, and the change rate becomes slower, and L2 arrives at the left end. The movements of L1 and L2 are opposite (mirror image) to each other. As illustrated in the figure, it is understood that the pupil division is performed gradually.

FIG. 7 schematically illustrates the correspondence relationship between the imaging element and the pupil division in an embodiment of the present invention. The first photoelectric conversion unit 301 and the second photoelectric conversion unit 302 (the first photoelectric conversion unit 301 to the N-th photoelectric conversion unit) respectively correspond to the first sub pixel 201 and the second sub pixel (the first sub pixel to the $N_{LF}$th sub pixel). In each pixel of the imaging element, the first sub pixel 201 and the second sub pixel 201, which are divided as 2×1 (the first sub pixel to the $N_{LF}$th sub pixel which are divided as Nx×Ny), respectively receive the light flux passing through the different partial pupil areas of the first partial pupil area 501 and the second partial pupil area 502 (the first partial pupil area to the $N_{LF}$th partial pupil area) in the focusing optical system. A LF data (input image) indicative of the spatial distribution and angle distribution for the light intensity is acquired from the signal corresponding to the light received by each sub pixel A signal from a certain sub pixel among the first sub pixel 201 and the second sub pixel 202 divided as 2×1 (the first sub pixel to the $N_{LF}$th sub pixel which are divided as Nx×Ny) is selected from the LF data (input data) such that a viewpoint image corresponding to the certain partial pupil area among the first partial pupil area 501 and the second partial pupil area 502 (the first partial pupil area to the $N_{LF}$th partial pupil area) can be generated. For example, a first viewpoint image having a resolution corresponding to the number of pixels N and corresponding to the first partial pupil area 501 in the focusing optical system can be generated by selecting the signal from the first sub pixel 201.

Also, the image with a resolution corresponding to the number of pixels N can be generated by synthesizing all of the signals from every pixel of the first sub pixel 201 and the second sub pixel 202 divided as 2×1 (the first sub pixel to the $N_{LF}$th sub pixel which are divided as Nx×Ny), from the LF data (input image).

As described above, the imaging element in an embodiment of the present invention has a structure in which the plurality of pixels provided with the plurality of photoelectric conversion units for receiving the light flux passing through the different partial pupil areas in the focusing optical system are arrayed, and can acquire the LF data (input image).

[Relationship Between a Defocus Amount and an Image Shift Amount]

Hereinafter, a description will be given of a relationship between the defocus amount between the first viewpoint image and the second viewpoint image (the first viewpoint image to the $N_{LF}$th viewpoint image) generated from the LF data (input image) acquired by the imaging element according to an embodiment of the present invention, and the image shift amount therebetween.

FIG. 8 schematically illustrates the relationship of the defocus amount between the first viewpoint image and the second viewpoint image, and the image shift amount therebetween. The imaging element (not shown) is arranged in an imaging plane 600, and the exit pupil of the focusing optical system is divided into the two parts that are the first partial pupil area 501 and the second partial pupil area 502 as 2×1, as is the case in FIG. 4 and FIG. 7.

In the defocus amount d, the distance from an imaging position of an object image to the imaging plane 600 is denoted by a magnitude |d| thereof. The defocus amount d is defined such that in a front focus state, in which the imaging position of the object image is on the object side compared to the imaging plane 600, it is negative (d<0), and in a rear focus state, in which the imaging position of the object image is the opposite to that of the front focus state, it is positive (d>0). In an in-focus state in which the imaging position of the object image is on the imaging plane (in-focus position), d is null (d=0). A position of an object 801 as illustrated in FIG. 8 shows the position corresponding to the in-focus state (d=0), and a position of an object 802 illustrates the position corresponding to the front focus state (d<0). Hereinafter, the front focus state (d<0) and the rear focus state (d>0) are collectively referred to as a "defocus state (|d|>0)".

In the front focus state (d<0), among the light from the object 802, the light flux that is passed through the first partial pupil area 501 (or the second partial pupil area 502) is temporarily converged, and then spreads with the width Γ1 (or Γ2) about a position G1 (or G2) of the median center of the light flux as a center. In this case, a blurred image is formed on the imaging plane 600. The blurred image is received by the first sub pixel 201 (or the second sub pixel 202) which constitutes each pixel unit arrayed in the imaging element to thereby generate a first viewpoint image (or a second viewpoint image). Thus, the first viewpoint image (or the second viewpoint image) is stored in the memory as the image data of the object image (blurred image) with the width Γ1 (or Γ2), at the position G1 (or G2) of the median center on the imaging plane 600. The width Γ1 (or Γ2) of the object image substantially increases in proportion to an increase in the magnitude |d| of the defocus amount d. Likewise, if the image shift amount of the object image between the first viewpoint image and the second viewpoint image is denoted by "p", the magnitude |p| thereof increases in response to the increase in the magnitude |d| of the defocus amount d. For example, the image shift amount p is defined as the difference "G1-G2" between the positions of the median center of the light flux, and the magnitude |p| thereof substantially increases in proportion to the increase in |d|. In the rear focus state (d>0), although the image shift direction of the object image between the first viewpoint image and the second viewpoint image is opposite to that in the front focus state, the magnitude |p| tends to increase as described above.

Accordingly, in an embodiment of the present invention, the magnitude of the image shift amount between the first viewpoint image and the second viewpoint image increases in response to the increase or decrease in the defocus amount between the first viewpoint image and the second viewpoint image or the image summing the first viewpoint image and the second viewpoint image.

[Refocus Processing and Sharpness/Unsharpness Control]

In an embodiment of the present invention, refocus processing for re-modifying a focus position with respect to the image after the photographing is performed by using the relationship between the defocus amount between the first viewpoint image and the second viewpoint image (the first viewpoint image to the $N_{LF}$th viewpoint image), and the image shift amount therebetween. An embodiment of the present invention performs the refocus processing, which combines a refocus by shift synthesis processing using the first viewpoint image and the second viewpoint image (the first viewpoint image to the $NLF_{th}$ viewpoint image), and sharpness/unsharpness control for adaptively controlling the area with the high degree of sharpness and the area with the high degree of blur by sharpening and smoothing in accordance with image shift difference amount distribution. However, the above description is not intended to limit the embodiment according to the present invention, and thus, only either one of the above refocus processing or the sharpness/unsharpness control may be performed with respect to the image. If either of the refocus processing or the control of the depth is performed, the step according to the other processing in FIG. 9 may be omitted.

Hereinafter, a description will be given of an image processing method for generating a processed image (output image) modified for the focus position and the blur sensation from the LF data (input image) acquired by the imaging element of an embodiment of the present invention, after the photographing, by using a schematic diagram of a flow of the refocus processing and the sharpness/unsharpness control in FIG. 9. The processing in FIG. 9 is carried out by CPU 121 and an image processing circuit 125 that are the image processing unit in an embodiment of the present invention.

[Multi-Viewpoint Image and Image of First Embodiment]

In step S1 of FIG. 9, a plurality of viewpoint images are generated for every area of the different partial pupil areas in the focusing optical system, from the LF data (input image) acquired by the imaging element of an embodiment of the present invention, and subsequently, an image (synthesis image) is generated in accordance with the pupil area in which the different partial pupil areas in the focusing optical system are synthesized.

In step S1, firstly, the LF data (input image) acquired by the imaging element of an embodiment of the present invention is input. Alternatively, the LF data (input image) previously photographed by the imaging element of an embodiment of the present invention and stored in the storage medium may be used.

Next, in step S1, a first viewpoint image and a second viewpoint image (or the first viewpoint image to the $N_{LF}$th viewpoint image) are generated for every area of the different partial pupil areas in the focusing optical system. The LF data (input image) is set as "LF". Also, a sub pixel signal which is the $i_s$th ($1 \leq i_s \leq Nx$) in the column direction and the $j_s$th ($1 \leq j_s \leq Ny$) in the row direction in each pixel signal of the LF, is set as "$k=Nx (j_s-1)+i_s (1 \leq k \leq N_{LF})$" and the kth sub pixel signal. The kth viewpoint image Ik(j, k), that is, the ith in the column direction and the jth in the row direction which corresponds to the kth partial pupil area in the focusing optical system, is generated by following a formula (1)

[Formula 1]

$$I_k(j,i) = I_{N_x(j_S-1)+i_S}(j,i) = LF(N_y(j-1)+j_S, N_x(i-1)+i_S). \quad (1)$$

An embodiment of the present invention is an exemplary configuration divided into two parts in the x direction, wherein Nx=2, Ny=1, $N_{LF}$=2. A signal from the certain sub pixel among the first sub pixel 201 and the second sub pixel 202, which are divided as the two parts in the x direction (the first sub pixel to the $N_{LF}$th sub pixel which are divided as Nx×Ny,) is selected every each pixel, from the LF data (input image) corresponding to the pixel array illustrated in FIG. 2, thereby generating a first viewpoint image and a second viewpoint image (the first viewpoint image to the $N_{LF}$th viewpoint image) that are the RGB signals of the Bayer arrangement having a resolution corresponding to the number of pixels N and corresponding to the certain partial pupil area among the first partial pupil area 501 and the second partial pupil area 502 (the first partial pupil area to the $N_{LF}$th partial pupil area) in the focusing optical system.

Here, a description will be given of shading due to a pupil shift between the first viewpoint image and the second viewpoint image (the first viewpoint image to the $N_{LF}$th viewpoint image). FIG. 10A to FIG. 10C illustrate a relationship between the first partial pupil area 501 in which the first photoelectric conversion unit 301 receives the light and the second partial pupil area 502 in which the second photoelectric conversion unit 302 receives the light, and the exit pupil 400 of the focusing optical system in the peripheral image height of the imaging element. Note that the same parts as those in FIG. 4 are illustrated with the same references as those in FIG. 4. The first photoelectric conversion unit 301 and the second photoelectric conversion unit 302 (the first photoelectric conversion unit to the $N_{LF}$th photoelectric conversion unit) respectively correspond to the first sub pixel 201 and the second sub pixel 202 (the first sub pixel to the $N_{LF}$th sub pixel).

FIG. 10A shows the case where the exit pupil distance Dl of the focusing optical system is the same as the set pupil distance Ds of the imaging element. In this case, the exit pupil 400 of the focusing optical system is substantially evenly pupil-divided into the first partial pupil area 501 and the second partial pupil area 502. In contrast, if the exit pupil distance Dl of the focusing optical system is shorter than the set pupil distance Ds of the imaging element as illustrated in FIG. 10B, a pupil shift occurs between the exit pupil of the focusing optical system and the entrance pupil of the imaging element at the peripheral image height of the imaging element, so that the exit pupil 400 of the focusing optical system is unevenly pupil-divided. Also, if the exit pupil distance Dl of the focusing optical system is longer than the set pupil distance Ds of the imaging element as illustrated in FIG. 10C, a pupil shift occurs between the exit pupil of the focusing optical system and the entrance pupil of the imaging element at the peripheral image height of the imaging element, so that the exit pupil 400 of the focusing optical system is unevenly pupil-divided. When uneven pupil division occurs at the peripheral image height, the intensity of the first viewpoint image and the second viewpoint image becomes uneven. Consequently, the shading occurs every RGB such that the intensity of either of the first viewpoint image and the second viewpoint image becomes relatively larger than that of the other one.

As necessary, to improve the shagging of each viewpoint image, shading correction processing (optical correction processing) may be performed every RGB with respect to each of the first viewpoint image and the second viewpoint image (the first viewpoint image to the $N_{LF}$th viewpoint image). Also, defect correction processing, saturation processing, demosaicing processing and the like may be performed as necessary.

Next, in Step S1 in FIG. 9, an image (synthesis image) is generated in accordance with the pupil area in which the different partial pupil areas in the focusing optical system are synthesized. The image I(j, i) that is the ith in the column direction and the jth in the row direction is generated by a formula (2).

[Formula 2]

$$I(j, i) = \sum_{k=1}^{N_{LF}} I_k(j, i) = \sum_{j_S=1}^{N_y} \sum_{i_S=1}^{N_x} LF(N_y(j-1)+j_S, N_x(i-1)+i_S). \quad (2)$$

An embodiment of the present invention is an exemplary configuration divided into two parts in the x direction, wherein Nx=2, Ny=1, and $N_{LF}$=2, and synthesizes all of the signals from the first sub pixel 201 and the second sub pixel 202, which are divided as two parts in the x direction (the first sub pixel to the $N_{LF}$th sub pixel which are divided as Nx×Ny), and generates an image that is a RGB signal of the Bayer arrangement having a resolution corresponding to the number of pixels N. As necessary, the shading correction processing, the defect correction processing, the saturation processing, the demosaicing processing and the like may be performed. In FIG. 11, the demosaicing processed image in an embodiment of the present invention is illustrated. A person (doll) is arranged in the middle, and at the left side, a flat plate with a fine checkerboard pattern is arranged with an angle from the front side to the back side.

As described above, in an embodiment of the present invention, in every area of the different partial pupil areas, the plurality of viewpoint images is generated from the input image acquired by the imaging element in which the plurality of pixels provided with the plurality of photoelectric conversion units for receiving the light flux passing through the different partial pupil areas in the focusing optical system, and subsequently, the image is generated in accordance with the pupil area in which the different partial pupil areas are synthesized. However, the above description is not intended to limit the present embodiment and the other embodiments, and thus, other well-known technique can be applied if the plurality of viewpoint images and the synthesis image thereof can be acquired. For example, as Japanese Patent Laid-Open No. 2011-22796, the cameras with the different plurality of viewpoints may be collectively used as the imaging element 107. Also, different from the optical system in FIG. 1, the configuration may be used such that the light flux from the imaging optical system on the microlens array is focused, and then, the imaging element is provided on its imaging surface so as to have a conjugating relationship between the surface of the object and the imaging element. Moreover, the configuration may be used such that the light flux from the imaging optical system on the microlens array is re-focused (referred to as "re-focus" since the light flux in the diffusion state which has been focused at once is focused), and the imaging element is provided on its imaging surface. Also, a method for inserting a mask with a proper pattern (gain modulation element) in an optical path of the imaging optical system can be used.

[Contrast Distribution of First Embodiment]

In step S2 of FIG. 9, contrast distribution is generated by extracting a high-frequency band component of a space frequency every area and from the image (synthesis image) and the plurality of viewpoint images in an embodiment of the present invention, respectively. The contrast distribution in an embodiment of the present invention is adjusted in accordance with the difference between the viewpoint images.

In step S2, firstly, from the image I(j, i) that is the RGB signal of the Bayer arrangement, the color gravity of each color RGB is matched every position (j, i), and then an image brightness signal Y is generated by a formula (3A). Also, from the kth viewpoint image Ik (k=1 to $N_{LF}$) that is the RGB signal of the Bayer arrangement, the kth viewpoint brightness signal Yk is generated by a formula (3B).

[Formula 3]

$$Y(j, i) = \begin{pmatrix} I(j-1, i-1) & I(j-1, i) & I(j-1, i+1) \\ I(j, i-1) & I(j, i) & I(j, i+1) \\ I(j+1, i-1) & I(j+1, i) & I(j+1, i+1) \end{pmatrix} \begin{pmatrix} \frac{1}{16} & \frac{2}{16} & \frac{1}{16} \\ \frac{2}{16} & \frac{4}{16} & \frac{2}{16} \\ \frac{1}{16} & \frac{2}{16} & \frac{1}{16} \end{pmatrix} \quad (3A)$$

$$Y_k(j, i) = \begin{pmatrix} I_k(j-1, i-1) & I_k(j-1, i) & I_k(j-1, i+1) \\ I_k(j, i-1) & I_k(j, i) & I_k(j, i+1) \\ I_k(j+1, i-1) & I_k(j+1, i) & I_k(j+1, i+1) \end{pmatrix} \begin{pmatrix} \frac{1}{16} & \frac{2}{16} & \frac{1}{16} \\ \frac{2}{16} & \frac{4}{16} & \frac{2}{16} \\ \frac{1}{16} & \frac{2}{16} & \frac{1}{16} \end{pmatrix} \quad (3B)$$

Next, in step S2, by using a formula (4A), an imaging high-frequency signal dY(j, i) is generated from the image brightness signal Y(j, i), by using a two-dimensional band pass filter for extracting the high-frequency component of the space frequency $\{F_{BPF}(j_{BPF}, i_{BPF}) | -n_{BPF} \le j_{BPF} \le n_{BPF}, -m_{BPF} \le i_{BPF} \le m_{BPF}\}$. Also, from the kth viewpoint brightness signal Yk(j, i) (k=1 to $N_{LF}$), the kth viewpoint high-frequency signal dYk(j, i) is generated by a formula (4B).

[Formula 4]

$$dY(j, i) = \left| \sum_{j_{BPF}=-n_{BPF}}^{n_{BPF}} \sum_{i_{BPF}=-m_{BPF}}^{n_{BPF}} F_{BPF}(j_{BPV}, i_{BPF}) \times Y(j+j_{BPF}, i+i_{BPF}) \right|, \quad (4A)$$

$$dY_k(j, i) = \left| \sum_{j_{BPF}=-n_{BPF}}^{n_{BPF}} \sum_{i_{BPF}=-m_{BPF}}^{n_{BPF}} F_{BPF}(j_{BPV}, i_{BPF}) \times Y_k(j+j_{BPF}, i+i_{BPF}) \right|. \quad (4B)$$

An embodiment of the present invention is an exemplary configuration divided into the two parts in the x direction, wherein Nx=2, Ny=1, and $N_{LF}$=2, in which the two-dimensional band pass filter is constituted as $F_{BPF}(j_{BPF}, i_{BPF})$=Fy$(j_{BPF})$×Fx$(i_{BPF})$ by the direct product of a one-dimensional filter Fx$(i_{BPF})$ in the x direction (pupil division direction) and a one-dimensional filter Fy $(j_{BPF})$ in the y direction (direction perpendicular to the pupil division direction). In the one-dimensional filter Fx$(i_{BPF})$ in the x direction that is the pupil division direction, a one-dimensional band pass filter such as, for example, 0.5×[1, 2, 0, −2, −1]+1.5×[1, 0, −2, 0, 1] can be used to extract the high-frequency component of the space frequency in the x direction. Here, the pass filter is set as a mixed filter that combines a first differential filter [1, 2, 0, −2, −1] and a second differential filter [1, 0, −2, 0, 1]. In general, when differential filter processing is performed, there is a 0 point where the reference is altered from positive to negative in the signal after the filter processing. Thus, a line may occur in the area with the high-frequency component of the space frequency by combining the absolute value calculation. A position in which the line occurs is altered by the differential filter depending on the degree of the differential. Therefore, in an embodiment of the present invention, the occurrence of the line is suppressed by using the mixed filter that combines the first differential filter and the second differential filter (in general, the differential filters with the different degrees). As necessary, the first differential filter such as [1, 2, 0, −2, −1] and the second differential filter such as [1, 0, −2, 0, 1], and a differential filter with the high degree, and a more general one-dimensional band pass filter may be used. In the one-dimensional filter Fy$(j_{BPF})$ in the y direction perpendicular to the pupil division direction, for example, a high-frequency cut (low pass) filter such as [1, 1, 1, 1, 1] or [1, 4, 6, 4, 1] can be used to suppress the high-frequency noise in the y direction. As necessary, the band pass filter processing for extracting the high-frequency component of the space frequency may be applied to any direction in the x direction and the y direction. An embodiment of the present invention illustrates the two-dimensional band pass filter configured by the direct product of the two one-dimensional filters. However, the present embodiment is not intended to limit the present invention, and the general two-dimensional band pass filter can be used.

Next, in step S2, the imaging high-frequency signal dY(j, i) is normalized by the image brightness signal Y(j, i) to generate a normalized imaging high-frequency signal dZ(j, i) by a formula 5(A) wherein $Y_0$>0. Also, the kth viewpoint high-frequency signal dYk(j, i) (k=1 to $N_{LF}$) is normalized by the kth viewpoint brightness signal Yk (j, i) to generate the normalized kth viewpoint high-frequency signal dZk(j, i) by a formula (5B). Determination of the maximum as "$Y_0$>0" in the denominator is to prevent division by "0". As necessary, prior to the normalization in the formula 5(A) and the formula 5(B), the high-frequency cut (low-pass) filter processing may be performed with respect to the image brightness signal Y(j, i) and the kth viewpoint brightness signal Yk(j, i) to suppress the high-frequency noise.

[Formula 5]

$$dZ(j,i)=dY(j,i)/\max(Y(j,i),Y_0), \quad (5A)$$

$$dZ_k(j,i)=dY_k(j,i)/\max(Y_k(j,i),Y_0). \quad (5B)$$

Next, in step S2, image contrast distribution C(j, i) is generated by a formula (6A), where a low brightness threshold is denoted by "Ymin", a contrast maximum threshold is denoted by "Cmax", and an exponent is denoted by "γ". In the first line of the formula (6A), if the image brightness signal Y(j, i) is smaller than the low brightness threshold Ymin, the value of the image contrast distribution C(j, i) is set as 0. In the third line of the formula (6A), if the normalized imaging high-frequency signal dZ(j, i) is larger than the contrast maximum threshold Cmax, the value of the image contrast distribution C(j, i) is set as 1. In other cases, in the second line of the formula (6A), the image contrast distribution C(j, i) is set as a value for normalizing the normalized imaging high-frequency signal dZ(j, i) with the contrast maximum threshold Cmax and raising to the γth power. As described above, the image contrast distribution C(j, i) is set as a value within the range of [0, 1](greater than or equal to 0 and less than or equal to 1). It is illustrated that the contrast is low if the value of C(j, i) is close to 0, and the contrast is high if the value is close to 1. The value is raised to the γth power to adjust a tone curve from 0 to 1 in the image contrast distribution C(j, i). Preferably, the exponent γ is greater than or equal to 1.5 and less than or equal to 2.5 to allow the change at the low contrast side to be moderate, and allow the change at the high contrast side to be sharp. As necessary, a composed function F(C(j, i)) may be set as the image contrast distribution by using a function F from the domain of definition [0, 1] to the domain range [0, 1]:[0, 1]→[0, 1]. Also, the kth viewpoint contrast distribution Ck(j, i) (k=1 to $N_{LF}$) is generated by a formulate (6B).

[Formula 6]

$$C(j, i) = \begin{cases} 0 & (Y(j, i) < Y_{min}), \\ (dZ(j, i)/C_{max})^\gamma & (dZ(j, i) \le C_{max}), \\ 1 & (dZ(j, i) > C_{max}). \end{cases} \quad (6A)$$

$$C_k(j, i) = \begin{cases} 0 & (Y(j, i) < Y_{min}), \\ (dZ_k(j, i)/C_{max})^\gamma & (dZ_k(j, i) \le C_{max}), \\ 1 & (dZ_k(j, i) > C_{max}). \end{cases} \quad (6B)$$

FIG. 12 illustrates an exemplary distribution of the image contrast distribution C(j, i) according to an embodiment of the present invention, FIG. 13 illustrates an exemplary distribution of a first viewpoint contrast distribution $C_1$(j, i), and FIG. 14 illustrates an exemplary distribution of a second viewpoint contrast distribution $C_2$(j, i). In the exemplary distributions illustrated in FIG. 12 to FIG. 14, a display of a gray scale at the right side with a range of [0, 1] presents an index for the level of the contrast. The white parts close to 1 comprise many of the high frequency components of the space frequency in the x direction and show the area with the high contrast, and the black parts close to 0 comprise the less high frequency components of the space frequency and show the area with low contrast.

By using FIGS. 15A to 15C, a description will be given of a relationship of the parallax between the plurality of viewpoint images (the first viewpoint image and the second viewpoint image), the perspective conflict, and the occlusion, in an embodiment of the present invention. In FIG. 15A to 15C, the imaging element in an embodiment of the present invention is arranged on the imaging plane 600, and the exit pupil of the focusing optical system is divided into two parts that are the partial pupil area 501 and the partial pupil area 502, as is the case with FIG. 4, FIG. 7, and FIG. 8.

FIG. 15A illustrates an exemplary configuration in which the perspective conflict occurs in the image when a blurred image Γ1+Γ2 of a front object q2 is photographed overlapping with a focused object p1 of an object q1. FIG. 15B and FIG. 15C respectively illustrate this exemplary configuration in which the light flux is passed through the partial pupil area 501 or the partial pupil area 502 in the focusing optical system.

In FIG. 15B, the light flux from the object q1 is passed through the partial pupil area 501, focused to the image p1 at in-focus state, and the light flux from the front object q2 is passed through the partial pupil area 501, spread as a blurred image Γ1 at the defocus state, and received by the sub pixel 201 of each pixel of the imaging element. The first viewpoint image is generated from a light-receiving signal from the sub pixel 201. In the first viewpoint image, the photographing is performed such that the image p1 of the object q1 is not overlapped with the blurred image Γ1 of the front object q2, and they are at the different positions. In the first viewpoint image, an exemplary configuration is illustrated in which there is no perspective conflict and the occlusion between the plurality of objects (the object q1 and the object q2).

In contrast, in FIG. 15C, the light flux from the object q1 is passed through the partial pupil area 502, focused to the image p1 at the in-focus state, and the light flux from the front object q2 is passed through the partial pupil area 502, spread as a blurred image Γ2 at the defocus state, and received by the sub pixel 202 of each pixel of the imaging element. The second viewpoint image is generated from the light-receiving signal derived from the sub pixel 202. In the second viewpoint image, the photographing is performed such that the image p1 of the object q1 is overlapped with the blurred image Γ2 of the front object q2. In the second viewpoint image, an exemplary configuration is illustrated such that there is the perspective conflict and the occlusion between the plurality of the objects (the object q1 and the object q2).

The exemplary configuration in FIGS. 15A to 15C illustrate that in the area close to that in which the perspective conflict and the occlusion occurs, there is some difference between the first viewpoint image and the second viewpoint image that constitutes the image with respect to the state in which the perspective conflict and the occlusion occurs, and then it is likely to increase the difference between the first viewpoint image and the second viewpoint image. Therefore, the area likely to cause the perspective conflict and the occlusion can be estimated by detecting the area with large differences between the plurality of viewpoint images.

FIG. 16 illustrates the difference amount distribution C1(j, i)−C2(j, i) of the first viewpoint contrast distribution $C_1$(j, i) and the second viewpoint contrast distribution $C_2$(j, i) in an embodiment of the present invention. In an exemplary distribution illustrated in FIG. 16, a display of a gray scale at the right side [−1, 1] shows the index of the magnitude of the difference between the contrast of the first viewpoint image and that of the second viewpoint image (the difference amount between the first viewpoint contrast distribution and the second viewpoint contrast distribution). The black parts close to 0 show the area with the small difference between the contrast of the first viewpoint image and that of the second viewpoint image. On the other hand, the white parts close to ±1 show the area with the large difference between the contrast of the first viewpoint image and that of the second viewpoint image.

In FIG. 16, the area generating the perspective conflict and the occlusion is detected in a body of a person (doll) and a flat plate with a fine checkerboard pattern at the lower side of the middle, as the white area with the large difference between the contrast of the first viewpoint image and that of the second viewpoint image. The area in which the high-frequency band component of the space frequency is largely varied between the first viewpoint image and the second viewpoint image, such as the area with the large image shift amount while holding the high contrast, for example, the edge portion of the object in the defocus state, is detected in addition to the area in which the perspective conflict and the occlusion occurs. In these detected areas, the object images are respectively photographed, whereof each space frequency component for the first viewpoint image and the second viewpoint image is significantly different from each other. Therefore, in the image that combines the first viewpoint image and the second viewpoint image, the area detected therefrom is the area in which the plurality of the object areas whose space frequency components are significantly different from each other are mixed.

When the image processing such as the sharpening and the smoothing is heavily applied to the mixed area of the plurality of the objects whose space frequency components are different from each other, it may cause the reduction for the quality of the image. Accordingly, in an embodiment of the present invention, the detection of the mixed area of the plurality of the objects whose space frequency components are different from each other is performed by using the absolute value $|C_1(j, i)-C_2(j, i)|$ of the difference amount distribution between the first viewpoint contrast distribution and the second viewpoint contrast distribution, and then the image processing such as the sharpening and the smoothing is performed to the detected mixed area in control. Thereby, the image processing such as the sharpening and the smoothing can be performed while successfully maintaining the quality of the image.

In an embodiment of the present invention, next, in step S2, by using a formula (7A), contrast difference amount distribution $C_{DIFF}(j, i)$ is generated from the first viewpoint contrast distribution $C_1(j, i)$ and the second viewpoint contrast distribution $C_2(j, i)$ to detect the mixed area of the plurality of the objects whose space frequency components are different from each other. Next, by using a formula (7B), contrast distribution $M_{CON}(j, i)$, in which the value in the mixed area of the plurality of objects whose space frequency components are different from each other is suppressed proximate to 0, is generated by multiplying the image contrast distribution $C(j, i)$ by the contrast difference amount distribution $C_{DIFF}(j, i)$.

[Formula 7]

$$C_{DIFF}(j,i)=1-|C_1(j,i)-C_2(j,i)|, \quad (7A)$$

$$M_{CON}(j,i)=C(j,i) \times C_{DIFF}(j,i). \quad (7B)$$

In the contrast difference amount distribution $C_{DIFF}(j, i)$, within the range of [0, 1], the value is close to 0 in the area in which the contrast difference between the viewpoint images is large and a lot of mixing of the objects whose space frequency components are different from each other, and the value is close to 1 in the area in which less contrast difference between the viewpoints and less mixing of the objects whose space frequency components are different from each other. The contrast distribution $M_{CON}(j, i)$ is the distribution produced by multiplying the image contrast distribution $C(j, i)$ by the contrast difference amount distribution $C_{DIFF}(j, i)$. Thereby, it is the distribution in which the value in the mixed area of the plurality of the objects whose space frequency components are different from each other is suppressed proximate to 0.

FIG. 17 illustrates an exemplary distribution of the contrast distribution $M_{CON}(j, i)$ in an embodiment of the present invention. In the exemplary distribution of FIG. 17, a display of a gray scale at the right side with a range of [0, 1] presents an index for the level of the contrast. The white parts close to 1 comprise many high frequency components of the space frequency in the x direction and show the area with the high contrast, and the black parts close to 0 comprise the lower frequency components of the space frequency and show the area with the low contrast. With respect to the image contrast distribution $C(j, i)$, the contrast value is suppressed in the area with the large absolute value $|C_1(j, i)-C_2(j, i)|$ of the difference amount distribution between the first viewpoint contrast distribution $C_1(j, i)$ and the second viewpoint contrast distribution $C_2(j, i)$.

In an embodiment of the present invention, as the contrast difference amount distribution $C_{DIFF}(j, i)$, the linear function that monotonically decreases is used with respect to the absolute value $|C_1(j, i)-C_2(j, i)|$ of the difference amount distribution between the first viewpoint contrast distribution and the second viewpoint contrast distribution, however, the more general function may be used as necessary.

As described above, in an embodiment of the present invention, in accordance with the difference between the contrast every viewpoint image, the contrast distribution $M_{CON}(j, i)$ is generated from the image and the plurality of viewpoint images. The contrast distribution in an embodiment of the present invention is larger in the area with a small difference between the contrast in every viewpoint image than in the area with the large difference between the contrast in every viewpoint image. Also, the contrast distribution in an embodiment of the present invention is larger in the area with many space frequency components in the image than in the area with less space frequency components in the image. Also, the contrast distribution in an embodiment of the present invention is larger in the area with high brightness than in the area with less brightness.

In the processing from the second processing, preferably, the generation of the contrast distribution $M_{CON}(j, i)$ is omitted, and the generated contrast distribution $M_{CON}(j, i)$ is stored in the storage medium or the like, such as the flash memory 133 in relation to the stored image data to shorten the processing time.

[Image Shift Amount Distribution]

In step S3 of FIG. 9, image shift amount distribution is generated based on the correlation (degree of coincidence between the signals) between the first viewpoint image and the second viewpoint image from the first viewpoint image and the second viewpoint image (the plurality of the viewpoint images), in each position at which the value of the contrast distribution $M_{CON}(j, i)$ is greater than or equal to a predetermined value. Note that this step is not intended to limit the present embodiment, and thus, the image shift amount distribution may be generated based on each viewpoint image, independently of the value of the contrast distribution $M_{CON}(j, i)$.

In step S3, firstly, one-dimensional band pass filter processing is performed in the pupil division direction (column direction) with respect to a first viewpoint brightness signal $Y_1$ generated by the formula (3B), from the first viewpoint image $I_1$ that is the RGB signal of the Bayer arrangement, and subsequently, a first focus detection signal dYA is generated. Also, the one-dimensional band pass filter processing is performed in the pupil division direction (column direction) with respect to a second viewpoint brightness signal $Y_2$ generated by the formula (3B), from a second viewpoint image $I_2$, and subsequently, a second focus detection signal dYB is generated. For example, the first differential filter [1, 5, 8, 8, 8, 8, 5, 1, −1, −5, −8, −8, −8, −8, −5, −1] or the like can be used as the one-dimensional band pass filter. As necessary, the pass band of the one-dimensional band pass filter may be adjusted.

Next, in step S3, in each position (j, i) at which the value of the contrast distribution $M_{CON}$(j, i) is greater than or equal to a predetermined value (for example, 0, 2), the first focus detection signal dYA and the second focus detection signal dYB are relatively shifted in the pupil division direction (column direction) to calculate a correlation amount indicative of the degree of coincidence between the signals, and then, the image shift amount distribution $M_{DIS}$(j, i) is generated based on the correlation amount. In contrast, each position at which the value of the contrast distribution $M_{CON}$ (j, i) is less than the predetermined value (for example, 0, 2) is omitted from the calculation of the image shift amount. The precision for the detection of the image shift amount can be improved and the processing can be performed at a high-speed by limiting the detection of the image shift amount in the area with a high contrast in which perspective contrast and occlusion do not occur.

With a central focus on the position (j, i), the first focus detection signal that is the $j_2$th in the row direction ($-n_2 \le j_2 \le n_2$) and the $i_2$th in the column direction, which is the pupil division direction ($-m_2 \le i_2 \le m_2$), is set as "dYA(j+$j_2$, i+$i_2$)", and the second focus detection signal is set as "dYB(j+$j_2$, i+$i_2$)". The shift amount is set as "s ($-n_s \le s \le n_s$)", the correlation amount $COR_{EVEN}$(j, i, s) at each position (j, i) is calculated by a formula (8A), and the correlation amount $COR_{ODD}$(j, i, s) is calculated by a formula (8B).

[Formula 8]

$$COR_{even}(j, i, s) = \sum_{j_2=-n_2}^{n_2} \sum_{i_2=-m_2}^{m_2} \left| \begin{array}{c} dYA(j+j_2, i+i_2+s) - \\ dYB(j+j_2, i+i_2-s) \end{array} \right| \quad (8A)$$

$$COR_{odd}(j, i, s) = \sum_{j_2=-n_2}^{n_2} \sum_{i_2=-m_2}^{m_2} \left| \begin{array}{c} dYA(j+j_2, i+i_2+s) - \\ dYB(j+j_2, i+i_2-1-s) \end{array} \right| \quad (8B)$$

The correlation amount $COR_{ODD}$(j, i, s) is the correlation amount in which the shift amount of the first focus detection signal dYA and the second focus detection signal dYB is shifted by −1 shift of the half phase with respect to the correlation amount $COR_{EVEN}$(j, i, s).

From each of the correlation amounts $COR_{EVEN}$ (j, i, s) and the correlation amounts $COR_{ODD}$ (j, i, s), the shift amount that is a real number value by which the correlation amount becomes the minimum value is calculated by sub-pixel calculation to calculate the average value, and then, the image shift amount distribution $M_{DIS}$(j, i) is generated.

It is set as "$M_{DIS}$(j, i)=0" in the area omitted from the calculation of the image shift amount in which the value of the contrast distribution $M_{CON}$(j, i) is less than the predetermined value (for example, 0 or 2). As necessary, the value except for null may be set.

FIG. 18 illustrates an exemplary distribution of the image shift amount distribution $M_{DIS}$ (j, i) in an embodiment of the present invention. In the exemplary distribution illustrated in FIG. 18, a display of a gray scale at the right side with a range of [−6, 6] presents the image shift amount between the first viewpoint image and the second viewpoint image by one-pixel (one pixel) unit, in the area in which the value of the contrast distribution $M_{CON}$(j, i) is greater than or equal to a predetermined value 0.2, and the image shift amount is calculated. The black side parts with the minus symbol (−) show the area in the front focus state, the value close to 0 shows the area in the substantial in-focus state, and the white side parts with the plus symbol (+) show the area in the rear focus state. Also, in the display of the exemplary distribution of FIG. 18, the area omitted from the calculation of the image shift amount and set as "$M_{DIS}$(j, i)=0", wherein the value of the contrast distribution $M_{CON}$(j, i) is less than 0.2 is illustrated as black.

As described above, in an embodiment of the present invention, the image shift amount distribution $M_{DIS}$ (j, i) is generated from the plurality of viewpoint images.

In the processing from the second processing, preferably, the generation of the image shift amount distribution $M_{DIS}$ (j, i) is omitted, and the generated image shift amount distribution $M_{DIS}$(j, i) is stored in the storage medium or the like, such as the flash memory 133 in relation to the stored image data to shorten the processing time.

As necessary, the image shift amount distribution $M_{DIS}$(j, i) may be transformed to the defocus amount distribution by multiplying a transformation coefficient in accordance with the position (j, i), the aperture value of the imaging lens (focusing optical system), the exit pupil distance and the like.

[Image Shift Difference Amount Distribution]

In step S4 of FIG. 9, image shift difference amount distribution $M_{DIFF}$(j, i) is generated from the image shift amount distribution $M_{DIS}$(j, i) and the predetermined image shift amount.

In step S4, firstly, the image shift amount required for the modification by the refocus processing in an embodiment of the present invention is set as the predetermined image shift amount "p". For example, in an exemplary configuration of the image shift amount distribution $M_{DIS}$ of FIG. 18, the image shift amount at the area close to the eyes is about 2.5. If, by the refocus processing, the image shift amount at the area close to the eyes of the person (doll) is substantially required to be slightly modified to 0, it is set as "the predetermined image shift amount p=2.5".

In step S4, next, based on the image shift amount distribution $M_{DIS}$ (j, i), the predetermined image shift amount p, and the contrast distribution $M_{CON}$ (j, i), the image shift difference amount distribution $M_{DIFF}$ (j, i) is calculated by a formula (9).

[Formula 9]

$$M_{DIFF}(j, i) = \left(1 - \frac{|M_{DIS}(j, i) - P|}{\sigma_p}\right) \times M_{CON}(j, i) \quad (9)$$

The image shift difference amount distribution $M_{DIFF}(j, i)$ is the distribution multiplying the linear function that monotonically decreases with respect to the absolute value $|M_{DIS}(j, i)-p|$ of the difference between the image shift amount distribution $M_{DIS}(j, i)$ and the predetermined image shift amount p, by the contrast distribution $M_{CON}(j, i)$. The image shift difference amount distribution $M_{DIFF}(j, i)$ is positive where $|M_{DIS}(j, i)-p|<\sigma_p$, and is null where $|M_{DIS}(j, i)-p|=\phi_p$, and is negative where $|M_{DIS}(j, i)-p|>\sigma_p$.

The area omitted from the calculation of the image shift amount in which the value of the contrast distribution $M_{CON}(j, i)$ is less than the predetermined value (for example, 0, 2) is set as "$M_{DIFF}(j, i)=(1-|p|/\sigma_p)\times M_{CON}(j, i)$". As necessary, other value may be set.

FIG. 19 illustrates the exemplary distribution of the image shift difference amount distribution $M_{DIFF}(j, i)$ in an embodiment of the present invention. The area in which the value of the contrast distribution $M_{CON}$ is greater than or equal to the predetermined value 0.2 and the image shift amount is calculated shows the image shift difference amount at a display of a gray scale within the range of [−1, 1] at the right side. The white side parts with the plus symbol (+) show the area with the high contrast in which the absolute value $|M_{DIS}(j, i)-p|$ of the difference between the image shift amount distribution $M_{DIS}(j, i)$ and the predetermined image shift amount p is small. The black side parts with the minus symbol (−) show the area with the high contrast in which the absolute value $|M_{DIS}(j, i)-p|$ of the difference between the image shift amount distribution $M_{DIS}(j, i)$ and the predetermined image shift amount p is large. Also, in the display of the exemplary distribution of FIG. 19, the area omitted from the calculation of the image shift amount in which the value of the contrast distribution $M_{CON}(j,i)$ is less than the predetermined value 0.2, where it is set as "$M_{DIFF}(j,i)=(1-|p|/\sigma_p)\times M_{CON}(j, i)$", is illustrated as black.

[Modified Viewpoint Image]

In step 35 of FIG. 9, in accordance with the image shift difference amount distribution $M_{DIFF}(j, i)$, processing of a first sharpening and a first smoothing is performed with respect to the first viewpoint image and the second viewpoint image (the first viewpoint image to the $N_{LF}$th viewpoint image) to generate a first modified viewpoint image and a second modified viewpoint image (first modified viewpoint image to the $N_{LF}$th modified viewpoint image).

In an embodiment of the present invention, processing for expanding the difference between the viewpoint images and sharpening the parallax (crosstalk correction, a first sharpening processing) is performed with respect to the first viewpoint image and the second viewpoint image (the plurality of viewpoint images) in the area in which the image shift difference amount distribution is greater than or equal to 0 ($M_{DIFF}(j, i)\geq 0$). On the other hand, processing for reducing the difference between the viewpoint images and smoothing the parallax (crosstalk, a first smoothing processing) is performed in the area in which the image shift difference amount distribution is less than 0 ($M_{DIFF}(j, i)<0$). Above processing is performed to generate the first modified viewpoint image and the second modified viewpoint image (the plurality of modified viewpoint images).

In step S5 of FIG. 9, firstly, a first intensity parameter is set as "$k_{ct}\geq 0$" to assign the intensity of the processing for expanding the difference between the viewpoint images and sharpening the parallax (crosstalk correction, the first sharpening processing) or the processing for reducing the difference between the viewpoint images and smoothing the parallax (crosstalk, the first smoothing processing) with respect to the first viewpoint image and the second viewpoint image (the plurality of viewpoint images).

Next, in step 35, a first intensity distribution $K_{ct}(j, i)$ is set by formula (10). The first intensity parameter distribution $K_{ct}(j, i)$ is proportional to the image shift difference amount distribution $M_{DIFF}(j, i)$, wherein $k_{ct}$ is set as a proportionality coefficient.

[Formula 10]

$$K_{ct}(j,i)=k_{ct}\times M_{DIFF}(j,i). \quad (10)$$

Next, in step S5, processing by formula (11A) and formula (11B) is performed with respect to the first viewpoint image $I_1(j, i)$ and the second viewpoint image $I_2(j, i)$ (the first viewpoint image to the $N_{LF}$th viewpoint image) to generate the first modified viewpoint image $MI_1(j, i)$ and the second modified viewpoint image $MI_2(j, i)$ (the first modified viewpoint image to the $N_{LF}$th modified viewpoint image).

[Formula 11]

$$\begin{pmatrix} MI_1(j, i) \\ MI_2(j, i) \end{pmatrix} = \begin{pmatrix} 1+K_{ct}(j, i) & -K_{ct}(j, i) \\ -K_{ct}(j, i) & 1+K_{ct}(j, i) \end{pmatrix} \begin{pmatrix} I_1(j, i) \\ I_2(j, i) \end{pmatrix}, \quad (11A)$$

$(K_{ct}(j, i) \geq 0),$ $$\begin{pmatrix} MI_1(j, i) \\ MI_2(j, i) \end{pmatrix} = \begin{pmatrix} \frac{1-K_{ct}(j, i)}{1-2K_{ct}(j, i)} & \frac{-K_{ct}(j, i)}{1-2K_{ct}(j, i)} \\ \frac{-K_{ct}(j, i)}{1-2K_{ct}(j, i)} & \frac{1-K_{ct}(j, i)}{1-2K_{ct}(j, i)} \end{pmatrix} \begin{pmatrix} I_1(j, i) \\ I_2(j, i) \end{pmatrix}, \quad (11B)$$

$(K_{ct}(j, i) < 0).$

The formula (11A) is the processing for expanding the difference between the first viewpoint image and the second viewpoint image (the plurality of viewpoint images) and sharpening the parallax in the area in which the first intensity parameter distribution (image shift difference amount distribution) is greater than or equal to 0 ($K_{ct}(j, i)=k_{ct}\times M_{DIFF}(j, i)\geq 0$) (crosstalk correction, the first sharpening processing). In contrast, the formula (11B) is the processing for reducing the difference between the first viewpoint image and the second viewpoint image (the plurality of viewpoint images) and smoothing the parallax in the area in which the first intensity parameter distribution (image shift difference amount distribution) is less than 0 ($K_{ct}(j, i)-k_{ct}\times M_{DIFF}(j, i)<0$) (crosstalk, the first smoothing processing).

FIG. 20 graphically illustrates an exemplary processing for expanding the difference between the first viewpoint image and the second viewpoint image (the plurality of viewpoint images) and sharpening the parallax (crosstalk correction, the first sharpening processing). The horizontal axis represents the position of the pixel and the vertical axis represents a pixel value (level of the signal). In FIG. 20, an exemplary configuration of the first viewpoint image (A prior to the modification) and the second viewpoint image (B prior to the modification) prior to the processing for the sharpening (crosstalk correction, the first sharpening) is illustrated as a graph of a dashed line. An exemplary configuration of the first modified viewpoint image (A after the modification) and the second modified viewpoint image (B after the modification) after the processing for the sharpening (crosstalk correction, the first sharpening) are illustrated as a graph of a solid line. By the processing for expanding the difference between the viewpoint images and sharpening the parallax (crosstalk correction, the first sharpening), the part with the large difference between the viewpoint images prior to the processing is further expanded, however, the part with less difference between the viewpoint images prior to the processing is little altered. Therefore, it is understood that the parallax between the viewpoint images is sharpened.

In contrast, in the processing for the smoothing by the formula (11B) (crosstalk, the first smoothing), the difference between the first viewpoint image and the second viewpoint image (the plurality of viewpoint images) is reduced and then the parallax between the viewpoint images becomes smoothed.

As described above, in an embodiment of the present invention, the image processing for the sharpening and the smoothing in accordance with the contrast distribution and the image shift amount distribution is performed with respect to the plurality of viewpoint images. The image processing in accordance with the contrast distribution and the image shift amount distribution may be performed as any one of the processes for sharpening, for smoothing, or the combined processing thereof.

In an embodiment of the present invention, by the formula (7A), the formula (7B), the formula (9), the formula (10), the formula (11A), and the formula (11B), the image processing, such as the sharpening and the smoothing, on each parallax image is performed more intensively in an area with the small difference between the contrast of every viewpoint image than in an area with the large difference between the contrast. Also, the image processing, such as the sharpening and the smoothing, on each parallax image is performed more intensively in an area with the large contrast distribution than in an area with the small contrast distribution.

In an embodiment of the present invention, by the formula (9), the formula (10), the formula (11A), and the formula (11B), the processing for the sharpening is performed in an area with a small difference from the predetermined shift amount (criterion) of the image shift amount distribution, and the processing for the smoothing is performed in an area with the large difference therefrom. In an embodiment of the present invention, by the formula (9), the formula (10), the formula (11A), the processing for the sharpening is processed more intensively in an area with a small difference from the predetermined shift amount of the image shift amount distribution than in an area with a large difference therefrom. In an embodiment of the present invention, by the formula (9), the formula (10), the formula (11B), the processing for the smoothing is performed more extensively in the area with a large difference from the predetermined shift amount of the image shift amount distribution than in an area with a small difference therefrom.

Also, in an embodiment of the present invention, by the formula (11A) and the formula (11B), the processing for expanding the difference between the plurality of viewpoint images for every pixel of the plurality of viewpoint images, and sharpening the parallax, or reducing the difference between the plurality of viewpoint images and smoothing the parallax is performed to generate the plurality of modified viewpoint images. The processing for the first sharpening in the formula (11A) and that for the second smoothing in the formula (11B) is the calculation processing between the first viewpoint image $I_1(j, i)$ that is the output signal of the first photoelectric conversion unit, and the second viewpoint image $I_2(j, i)$ that is the output signal of the second photoelectric conversion unit, which are included in each (j, i) pixel.

[Weighting Coefficient]

In step S6 of FIG. 9, to slightly modify a depth of field at the predetermined area, a weighting coefficient is set for every image of the first modified viewpoint image and the second modified viewpoint image (the first modified viewpoint image to the $N_{LF}$th modified viewpoint image).

In step S6, firstly, the predetermined area required for the re-modification of the depth of field "R=[j1, j2]×[i1, i2]" and the border width σ of the predetermined area are firstly set, and subsequently, a table function T(j, i) is calculated in accordance with the predetermined area R and the border width σ of the predetermined area by a formula (12).

[Formula 12]

$$T(j, i) = 0.5 * \left[\tanh\frac{(j-j_1)}{\sigma} - \tanh\frac{(j-j_2)}{\sigma}\right] \times \\ 0.5 * \left[\tanh\frac{(i-i_1)}{\sigma} - \tanh\frac{(i-i_2)}{\sigma}\right]. \quad (12)$$

The table function T(j, i) becomes 1 within the predetermined area R, and becomes 0 outside the predetermined area R, and substantially and successively alters from 1 to 0 at the border width σ of the predetermined area R. As necessary, the predetermined area may be circular-shaped or any other shape. As necessary, the plurality of the predetermined areas and the border widths may also be set.

Next, in step 36, as a real coefficient w (−1≤w≤1), first weighting coefficient distribution $W_1(j, i)$ of the first modified viewpoint image $MI_1(j, i)$ is calculated by a formula (13A), and second weighting coefficient distribution $W_2(j, i)$ is calculated by a formula (13B).

[Formula 13]

$$W_1(j,i)=1-wT(j,i), \quad (13A)$$

$$W_2(j,i)=1+wT(j,i). \quad (13B)$$

In the predetermined area, if the depth of field is modified by increasing the summation ratio of the first modified viewpoint image $MI_1(j, i)$, it is set within the range of "−1≤w<0", and if the depth of field is modified by increasing the summation ratio of the second modified viewpoint image $MI_2(j, i)$, it is set within the range of "0<w≤1". As necessary, the depth of field does not need to be modified where w=0 and $W_1 \equiv W \equiv 1$.

[Refocus by the Shift Synthesis Processing]

In step 37 of FIG. 9, processing for multiplying the weighting coefficient by every image of the first modified viewpoint image and the second modified viewpoint image (the first modified viewpoint image to the $N_{LF}$th modified viewpoint image), and then relatively shifting and summing the obtained value in the pupil division direction (x direction) (shift summation processing) is performed to generate an intermediate image that is a synthesis image made by synthesizing the plurality of viewpoint images.

FIG. 21 is a diagram schematically illustrating a refocus by the shift synthesis processing in the pupil division direction (x direction) by the first modified viewpoint image $MI_1(j, i)$ and the second modified viewpoint image $MI_2(j, i)$ (the plurality of modified viewpoint images). In FIG. 21, the x axis is set as the vertical direction of the plane of the paper, and the downward is set as the forward direction of the x axis, and the direction perpendicular to the plane of the paper is set as the y axis, and the front side is set as the forward direction of the y axis, and the left-right direction of the plane of the paper is set as the z axis, and the left side is set as the forward direction of the z axis. The imaging plane 600 in FIG. 21 corresponds to the imaging plane 600 illustrated in FIG. 7, FIG. 8 (and FIGS. 15A to 15C).

FIG. 21 schematically illustrates the first modified viewpoint image $MI_1$ (j, i) and the second modified viewpoint image $MI_2$(j, i). The signal of the first modified viewpoint image $MI_1$(j, i) is a light-receiving signal of the light flux incident to the first photoelectric conversion unit 301 at the position (j, i), with a chief ray angle $\theta_1$ corresponding to the first partial pupil area 501 in FIG. 7. The signal of the second modified viewpoint image $MI_2$(j, i) is a light-receiving signal of the light flux incident to the second photoelectric conversion unit 302 at the position (j, i), with a chief ray angle $\theta_2$ corresponding to the second partial pupil area 502 in FIG. 7. The first photoelectric conversion unit 301 and the second photoelectric conversion unit 302 (the first photoelectric conversion unit to the $N_{LF}$th photoelectric conversion unit) respectively correspond to the first sub pixel 201 and the second sub pixel 202 (the first sub pixel to the $N_{LF}$th sub pixel).

The first modified viewpoint image $MI_1$(j, i) and the second modified viewpoint image $MI_2$(j, i) (the plurality of modified viewpoint images) comprise not only information about the light intensity distribution but also that about the incident angle. Therefore, the following translational movement and summing processing can generate a refocused image at a virtual imaging surface 610. The translational movement and summing processing comprises, firstly, processing for translationally moving the first modified viewpoint image $MI_1$(j, i) to the virtual imaging surface 610 along the chief ray angle $\theta_1$ and translationally moving the second modified viewpoint image $MI_2$(j, i) to the virtual imaging surface 610 along the chief ray angle $\theta_2$. The translational movement and summing processing comprises, secondly, processing for summing the first modified viewpoint image $MI_1$(j, i) and the second modified viewpoint image $MI_2$(j, i), each of which are translationally moved.

Translationally moving the first modified viewpoint image $MI_1$(j, i) to the virtual imaging surface 610 along the chief ray angle $\theta_1$ corresponds to the shift by −1 pixel to the column direction. Also, translationally moving the second modified viewpoint image $MI_2$(j, i) to virtual imaging surface 610 along the chief ray angle $\theta_2$ corresponds to the shift by +1 pixel to the column direction. Therefore, a refocus signal at the virtual imaging surface 610 can be generated by relatively shifting the first modified viewpoint image $MI_1$(j, i) and the second modified viewpoint image $MI_2$(j, i) by +2 pixels, and adapting $MI_1$(j, i) and $MI_2$(j, i+2) and then, summing the adapted value.

In step 37 of FIG. 9, by a formula (14), a shift synthesis image $I_s$(j, i), which is the refocused image at the virtual imaging surface, is generated from the first modified viewpoint image $MI_1$(j, i) and the second modified viewpoint image $MI_2$(j, i) (the plurality of modified viewpoint images), wherein an even number most proximate to the predetermined image shift amount p is set as "pe". Here, the even number pe most proximate to the predetermined image shift amount p is calculated by pe=2×ROUND(p/2) as a function for rounding-off.

[Formula 14]

$$I_s(j,i)=W_1(j,i)\times MI_1(j,i)+W_2(j,i)\times MI_2(j,i-pe). \quad (14)$$

In the formula (14), at the same time as the shifting summation, the first weighting coefficient distribution $W_1$(j, i) in the formula (13A) is multiplied by the first modified viewpoint image $MI_1$(j, i), and the second weighting coefficient distribution $W_2$(j, i) in the formula (13B) is multiplied by the second modified viewpoint image $MI_2$(j, i) to modify the depth of field at the predetermined area. As necessary, the depth of field does not need to be modified, wherein it is set as "$W_1 \equiv W_2 \equiv 1$". The shift synthesis processing is performed by multiplying the weighting coefficient by every image of the plurality of parallax images to generate an intermediate image that is a synthesis image by the plurality of viewpoint images The shift synthesis processing of the first modified viewpoint image $MI_1$(j, i) and the second modified viewpoint image $MI_2$(j, i) (the plurality of modified viewpoint images) is not limited to the shift for the even number, or the summation processing, and so, and the shift for the real number or the more general synthesis processing may be used as necessary, Also, as necessary, the step S8 in FIG. 9 as described below may be omitted, and the shift synthesis image $I_s$(j, i) generated by shift-summing the first modified viewpoint image and the second modified viewpoint image (the plurality of modified viewpoint images) by the formula (14) may be set as the output image.

In an embodiment of the present invention, termination processing for previously expanding the data length with respect to the terminal part of the pupil division direction (x direction) of the second modified viewpoint image $MI_2$(j, i) is performed to maintain the pixel number of the shift synthesis image $I_s$(j, i) generated by the formula (14) so as to be same number as the pixel number of the image N. If pe>0, the termination processing is performed by a formula (15A) with respect to the column number $i_e$($i_{min} \leq i_e \leq i_{min}+$pe−1) at the terminal, wherein the minimum column number is set as $i_{min}$. If pe<0, the termination processing is performed by a formula (15B) with respect to the column number $i_e$($i_{max}+pe+1 \leq i_e \leq i_{max}$) at the terminal, wherein the maximum column number is set as $i_{max}$. In an embodiment of the present invention, processing for expanding the size of the image of the plurality of modified viewpoint images is performed.

$$MI_2(j,i_e)=MI_2(j,i_{min}+pe+\mod(i_e-i_{min},2)),(pe>0), \quad (15A)$$

$$MI_2(j,i_e)=MI_2(j,i_{max}+pe-\mod(i_e-i_{max},2)),(pe<0), \quad (15B)$$

[Refocusable Range]

Referring to a schematic diagram of FIG. 22, a description will be given of a refocusable range by the shift synthesis processing in an embodiment of the present invention. An imaging element (not shown) is arranged in the imaging plane 600, and the exit pupil of the focusing optical system is divided as 2×1, that is, divided into the first partial pupil area 501 and the second partial pupil area 502 as is the cases of FIG. 4, FIG. 7, and FIG. 8.

When an allowable confusion circle diameter is denoted by δ and an aperture value of the focusing optical system is denoted by F, a depth of field at the aperture value F is ±F×δ. In contrast, the effective aperture value $F_{01}$ (or $F_{02}$) in the pupil division direction (x direction) of the partial pupil area 501 (or 502), of which the surface is divided as Nx×Ny (for example, 2×1) and becomes narrow, is set as $F_{01}$=Nx×F (or $F_{02}$=Nx×F), and then the area becomes dark. The effective depth of field every image of the first modified viewpoint image (or the second modified viewpoint image) Nx times deepen by ±Nx×F×δ and the in-focus range is spread over Nx times. In the range of the effective depth of field "±Nx×F×δ", the object image that makes every image of the first modified viewpoint image in focus (or the second modified viewpoint image) is acquired. Therefore, the in-focus position can be refocused after the photographing by the processing for translationally moving the first modified viewpoint image (or the second modified viewpoint image) along the chief ray angle θ₁ (or θ₂) as shown in FIG. 21, and summing the moved images.

The defocus amount d from the imaging plane 600, which can refocus the in-focus position after the photographing, has a limit. The refocusable range of the defocus amount d is generally in the range of a formula (16):

[Formula 16]

$$|d| \leq N_F \times F \times \delta. \tag{16}$$

wherein the allowable confusion circle diameter δ is defined by δ=2·ΔX (reciprocal of the Nyquist frequency 1/(2·ΔX) of the pixel cycle ΔX) or the like.

However, as illustrated in the exemplary pupil intensity distribution of FIG. 6, the pupil division by the microlens of several μm in a diameter and the photoelectric conversion unit divided into a plurality of parts formed in each pixel unit is gently performed due to the diffraction blur by the wave nature of the light. Therefore, the depth of the focal point becomes insufficiently deep in the pupil division direction (x direction) of the first viewpoint image and the second viewpoint image (the plurality of viewpoint images), whereby the sufficient refocus effect does not need to be obtained even if the refocused image is generated by using the first viewpoint image and the second viewpoint image (the plurality of viewpoint images).

Accordingly, in an embodiment of the present invention, processing for expanding the difference between the first viewpoint image and the second viewpoint image (the plurality of viewpoint images) and sharpening the parallax (crosstalk correction, the first sharpening) is performed by the formula (11A) every pixel in which the first intensity parameter distribution (image shift difference amount distribution) is greater than or equal to 0 ($K_{ct}(j, i) = k_{ct} \times M_{DIFF}(j, i) \geq 0$), with respect to the first viewpoint image and the second viewpoint image (the plurality of viewpoint images) in the refocus by the shift synthesis processing to generate the first modified viewpoint image and the second modified viewpoint image (the plurality of modified viewpoint images). Thereby, the effective aperture value F of the first modified viewpoint image and the second modified viewpoint image (the plurality of modified viewpoint images) in the pupil division direction (x direction) can be largely modified, and the depth of the focal point can be deeply modified to improve the refocus effect.

Hereinafter, referring to FIGS. 23A to 23B, a description will be given of an effect of the processing for sharpening the first viewpoint image and the second viewpoint image (the plurality of viewpoint images) (crosstalk correction, the first sharpening) in the refocus by the shift synthesis processing. FIG. 23A illustrates an exemplary refocused image by the shift synthesis processing of the first viewpoint image and the second viewpoint image prior to the sharpening (crosstalk correction, the first sharpening) in the prior art. In this exemplary image, it is shown that the pupil division is gentle, and it is not sufficient for the depth of the focal point in the pupil division direction (x direction) of the first viewpoint image and the second viewpoint image (the plurality of viewpoint images). The refocus by the shift synthesis processing is performed with respect to the image in the rear focus state in which the focal point is at the position in the rear of the right eye of the person (doll), however, the right eye, the eyelashes, the hair, and the like of the person (doll) is still in the small blurred state, for which a sufficient refocus effect is not obtained. In contrast, FIG. 23B illustrates an exemplary refocused image by the shift synthesis processing of the first modified viewpoint image and the second modified viewpoint image after the sharpening (crosstalk correction, the first sharpening) in an embodiment of the present invention. In this exemplary image, the effective aperture value F of the first modified viewpoint image and the second modified viewpoint image (the plurality of modified viewpoint images) in the pupil division direction (x direction) is largely modified, and the depth of the focal point is deeply modified by the processing for expanding the difference between the first viewpoint image and the second viewpoint image (the plurality of viewpoint images) and sharpening the parallax (crosstalk correction, the first sharpening). By the refocus with the shift synthesis processing, the focus position is re-modified in accordance with the right eye, the eyelashes, the hair, and the like in the person (doll) after the photographing to improve the refocus effect.

Also, if the number of the pupil division is small and the number of the viewpoint images is small as an embodiment of the present invention with the two division in the pupil division direction (x direction) wherein Nx=2, Ny=1, $N_{LF}$=2, an artificial double line blur occurs in the area in which the blur amount (image shift amount) increases in the refocus by the shift synthesis processing to cause the border of the object to be double, which may reduce the quality of the image.

Accordingly, in an embodiment of the present invention, the processing for reducing the difference between the first viewpoint image and the second viewpoint image (the plurality of viewpoint images) and smoothing the parallax (crosstalk, the first smoothing) is performed by the formula (11B) with respect to the first viewpoint image and the second viewpoint image (the plurality of viewpoint images) for every pixel in which the first intensity parameter distribution (image shift difference amount distribution) is less than 0 ($K_{ct}(j, i) - k_{ct} \times M_{DIFF}(j,i) < 0$) in the refocus by the shift synthesis processing. By this processing, the first modified viewpoint image and the second modified viewpoint image (the plurality of modified viewpoint images) are generated. Thereby, the refocus by the shift synthesis processing can be performed while the occurrence of the artificial double-line blur is suppressed to successfully maintain the quality of the image in the area in which the blur amount (image shift amount) increases.

[Sharpness/Unsharpness Control]

In step 38 of FIG. 9, by performing the processing of a second sharpening and a second smoothing with respect to the shift synthesis image (intermediate image) generated by the first modified viewpoint image and the second modified viewpoint image (the first modified viewpoint image to the $N_{LF}$th modified viewpoint image) in accordance with the image shift difference amount distribution $M_{DIFF}(j, i)$, an output image is generated, which the sharpness/unsharpness control is performed by adaptively controlling the area with the high degree of the sharpness and the area with the high degree of the blur after the photographing.

In an embodiment of the present invention, with respect to the shift synthesis image $I_s(j, i)$, the processing for the second sharpening is performed in the area in which the image shift difference amount distribution is greater than or equal to 0 ($M_{DIFF}(j, i) \geq 0$), while the processing for the second smoothing is performed in the area in which the image shift difference amount distribution is less than 0 ($M_{DIFF}(j,i) < 0$) to generate the output image.

In step S8 of FIG. 9, firstly, a second intensity parameter $k_{USM} \geq 0$ is set to assign the intensity of the processing for the second sharpening or the second smoothing with respect to the shift synthesis image $I_s(j, i)$.

Next, in step S8, the two-dimensional low pass filter $\{F_{LPF}(j_{LPF}, i_{LPF})|-n_{LPF} \leq j_{LPD} \leq n_{LPF}, -m_{LPF} \leq i_{LPF} \leq m_{LPF}\}$ is used with respect to the shift synthesis image $I_s(j, i)$, and then, an unsharp mask $I_{USM}(j, i)$ is calculated by a formula (17). The two-dimensional low pass filter $F_{LPF}(j_{LPF}, i_{LPF})$ can be used as for example, the two-dimensional filter such as $^t[1, 0, 2, 0, 1] \times [1, 0, 2, 0, 1]$. As necessary, the two-dimensional Gaussian distribution or the like may be used.

[Formula 17]

$$I_{USM}(j, i) = I_S(j, i) - \sum_{j_{LPF}=-n_{LPF}}^{n_{IMF}} \sum_{i_{LPF}=-m_{LPF}}^{m_{IMF}} F_{LPF}(j_{LPF}, i_{LPF}) \times I_S(j + j_{CPF}, i + i_{LPF}). \quad (17)$$

Finally, in step S8, by a formula (18), the processing for the second sharpening or the second smoothing is performed by using the unsharp mask $I_{USM}(j, i)$ with respect to the shift synthesis image $I_s(j, i)$ in accordance with the image shift difference amount distribution $M_{DIFF}(j, i)$ to generate a refocused image $I_{RF}(j, i)$ that is the output image.

[Formula 18]

$$I_{RF}(j,i) = I_S(j,i) + k_{USM} \times M_{DIFF}(j,i) \times I_{USM}(j,i). \quad (18)$$

In the area in which the image shift difference amount distribution is greater than or equal to 0 ($M_{DIFF}(j,i) \geq 0$), the formula (18) is the processing for sharpening the shift synthesis image $I_s(j, i)$ in accordance with the magnitude of the image shift difference amount distribution $M_{DIFF}(j, i)$ by the unsharp mask $I_{USM}(j, i)$ multiplied by a positive coefficient $k_{USM} \times M_{DIFF}(j, i)$ (the second sharpening processing).

In contrast, in the area in which the image shift difference amount distribution is less than 0 ($M_{DIFF}(j, i) < 0$), the formula (18) is the processing for smoothing the shift synthesis image $I_S(j, i)$ in accordance with the magnitude of the image shift difference amount distribution $M_{DIFF}(j, i)$ by the unsharp mask $I_{USM}(j, i)$ multiplied by a negative coefficient $k_{USM} \times M_{DIFF}(j, i)$.

In the refocus by the shift synthesis processing, the refocus can be performed based on the optical principle, by using the LF data. The refocus by the shift synthesis processing has the advantage of being capable of performing the processing even in the area in which the image shift difference amount distribution cannot be detected.

However, if the pupil division direction is only one direction of the x direction (y direction) as the pupil division in an embodiment of the present invention (Nx=2, Ny=1, $N_{LF}$=2), the refocus effect can be obtained in the x direction of the pupil division direction (y direction), but it does not need to be obtained sufficiently in the y direction perpendicular to the pupil division direction (x direction). In contrast, in the control of the blur by the sharpening and the smoothing in accordance with the image shift difference amount distribution, the refocus effect can be obtained independent of the pupil division direction. Therefore, in an embodiment of the present invention, the refocus processing is performed as the processing for combining the refocus by the shift synthesis processing and the control of the blur by the sharpening and the smoothing in accordance with the image shift difference amount distribution. Thereby, the refocus effect can be obtained even in the direction perpendicular to the pupil division direction.

As described above, in an embodiment of the present invention, the image processing for the sharpening and the smoothing in accordance with the contrast distribution and the image shift amount distribution is performed with respect to the synthesis image $I_S(j, i)$ of the plurality of modified viewpoint images to generate the output image.

As necessary, the processing of step $35$, step S6, and step S7 in FIG. 9, which are the refocus by the shift synthesis processing, may be omitted, and the image processing for the sharpening and the smoothing in accordance with the contrast distribution and the image shift amount distribution may be performed to generate the output image. The image processing in accordance with the contrast distribution and the image shift amount distribution may be any one of the processing for the sharpening, the processing for the smoothing, or the combined processing thereof, as necessary.

In an embodiment of the present invention, by the formula (7A), the formula (7B), the formula (9), the formula (17), and the formula (18), the image processing such as the sharpening and the smoothing with respect to the synthesis image of the plurality of modified viewpoint images (or the image) is performed more intensively in the area with a small difference between the contrast every viewpoint images than in the area with the large difference therebetween. Also, the image processing such as the sharpening and the smoothing with respect to the synthesis image of the plurality of modified viewpoint images (or the image) is performed more intensive in the area with the large contrast distribution than in the area with the small contrast distribution.

In an embodiment of the present invention, by the formula (9), the formula (17), and the formula (18), the processing for the sharpening is performed in the area with a small difference from the predetermined shift amount (criterion) of the image shift amount distribution, and the processing for the smoothing is performed in an area with a large difference therefrom. In an embodiment of the present invention, by the formula (9), the formula (17), and the formula (18), the processing for the sharpening is performed more intensively in an area with a small difference from the predetermined shift amount of the image shift amount distribution than in an area with a large difference therefrom. In an embodiment of the present invention, by the formula (9), the formula (17), and the formula (18), the processing for the smoothing is performed more intensively in an area with a large difference from the predetermined shift amount of the image shift amount distribution than in an area with a small difference therefrom.

Hereinafter, a description will be given of an effect of an embodiment of the present invention.

The quality of the image may be reduced if the image processing such as the sharpening and the smoothing is thoroughly performed with respect to an area in which the plurality of the object images whose space frequency components are significantly different from each other are mixed, such as the area in which the perspective conflict and the occlusion occur.

To solve the above problem, in an embodiment of the present invention, firstly, the contrast difference amount distribution $C_{DIFF}(j, i)$ is generated by the formula (7A), from the first viewpoint contrast distribution $C_1(j, i)$ and the second viewpoint contrast distribution $C_2(j, i)$ to detect the area in which the plurality of the object images whose space frequency components are significantly different from each other are mixed. In the contrast difference amount distribution $C_{DIFF}(j, i)$, at the distribution with a range of [0, 1], the value is close to the value of 0 in the area with the large contrast difference between the viewpoint images and a lot of mixes of the object images with different space frequency components, and the value is close to the value of 1 in the area with the small contrast difference between the viewpoint images and less mixes of the object images with the different space frequency components.

In an embodiment of the present invention, secondly, the contrast distribution $M_{CON}(j, i)$ in which the value in the area where the plurality of object images whose space frequency components are significantly different from each other are mixed is suppressed proximate to 0 is generated by multiplying the generated contrast difference amount distribution $C_{DIFF}(j, i)$ by the image contrast distribution $C(j, i)$ that is the contrast distribution of the synthesis image obtained from the plurality of viewpoint images in the formula (7B).

In an embodiment of the present invention, thirdly, based on the generated contrast distribution $M_{CON}(j, i)$, with respect to the plurality of viewpoint images and synthesis image thereof, the relatively weak image processing such as the sharpening and the smoothing is performed in an area with a lot of mixing of the object images with the different space frequency components, and the relatively strong image processing such as the sharpening and the smoothing is performed in the area with the less mixing of the object images with the different space frequency components.

Accordingly, an embodiment of the present invention can perform the image processing for the sharpening and the smoothing while successfully maintaining the quality of the image by these configurations.

Also, the quality of the image may be reduced if the image processing such as the sharpening and the smoothing is performed thoroughly in an area with a low brightness. In an embodiment of the present invention, in the first line of the formula (6) and the formula (7B), the value of the contrast distribution $M_{CON}(j, i)$ is set as 0, if it is smaller than the low brightness threshold Ymin. Therefore, in the contrast distribution $M_{CON}(j, i)$ of an embodiment of the present invention, the contrast in an area with a high brightness of the image is higher than that with a low brightness thereof. To successfully maintain the quality of the image, based on the contrast distribution $M_{CON}(j, i)$, preferably, the relatively weak image processing such as the sharpening and the smoothing is performed in an area with the brightness smaller than the low brightness threshold Ymin, and the relatively strong image processing such as the sharpening and the smoothing is performed in an area with the brightness greater than or equal to the low brightness threshold Ymin with respect to the plurality of viewpoint images and the synthesis image thereof.

Hereinafter, referring to FIG. 24A to 24B, a description will be given of the effect for the refocus processing illustrated in FIG. 9 in an embodiment of the present invention (the refocus by the shift synthesis processing, the modifying processing of the depth of field, the control of the blur by the sharpening, and the smoothing in accordance with the image shift difference amount distribution). FIG. 24A illustrates an exemplary image prior to the refocus processing in the prior art. It is an exemplary image in the rear focus state in which it is focused in the rear of the right eye of the person (doll). FIG. 24B illustrates an exemplary refocused image after the refocus processing in an embodiment of the present invention. By the refocus in an embodiment of the present invention, the focus position is re-modified in accordance with the left and the right eyes, the eyelashes, the hair, and the like in the person (doll), while successfully holding the quality of the image.

As described above, the image processing method in an embodiment of the present invention is an image processing method for generating an output image from an input image acquired by an imaging element in which a plurality of pixels provided with a plurality of photoelectric conversion units for receiving light flux passing through different partial pupil areas in the focusing optical system are arrayed, the method comprising: generating a plurality of viewpoint images for every area of the different partial pupil areas, from the input image; generating an captured image in accordance with a pupil area in which the different partial pupil areas are synthesized, from the input image; generating a contrast distribution from the captured image and the plurality of viewpoint images; generating an image shift amount distribution from the plurality of viewpoint images; and generating the output image by performing image processing in accordance with the contrast distribution and the image shift amount distribution with respect to at least one of the captured image, the plurality of viewpoint images, or a synthesis image thereof.

The image processing device in an embodiment of the present invention is an image processing device with an image processing unit configured to perform the image processing method as described above.

An image pickup apparatus in an embodiment of the present invention is an image pickup apparatus with an imaging element in which a plurality of pixels provided with a plurality of sub pixels for receiving the light flux passing thorough different partial pupil areas in the focusing optical system are arrayed, and the image processing unit configured to perform the image processing method as described above.

The configuration in an embodiment of the present invention can perform the image processing for the sharpening and the smoothing, while successfully maintaining the quality of image.

Second Embodiment

Next, a description will be given of a second embodiment of the present invention. In the second embodiment, the same elements as those in the first embodiment are designated by the same reference numerals and the detail description thereof will be omitted, and mainly the difference therebetween are described.

In an embodiment of the present invention, processing for modifying saturation after the photographing is performed by using a relationship between a defocus amount between a first viewpoint image and a second viewpoint image (the first viewpoint image to the $N_{LF}$th viewpoint image) and an image shift amount therebetween.

Hereinafter, by using a schematic diagram of a flow of the saturation processing in FIG. 25, a description will be given of an image processing method for generating a saturation modified image (output image) modified for the saturation after the photographing, with respect to an image, from LF data (input image) acquired by an imaging element in an embodiment of the present invention.

The steps up to the generation of the image shift difference amount distribution in step S4 of FIG. 25 are the same as those in the first embodiment.

[Saturation Modification Processing]

In step S5 of FIG. 25, processing for emphasizing and reducing the saturation is performed on an image in accordance with image shift difference amount distribution $M_{DIFF}$ (j, i) to generate the output image modified for the saturation.

In an embodiment of the present invention, with respect to the image I(j, i), the processing for emphasizing the saturation is performed in the area in which the image shift difference amount distribution is greater than or equal to 0 ($M_{DIFF}$(j, i)≥0), and in contrast, the processing for reducing the saturation is performed in the area in which the image shift difference amount distribution is less than 0 ($M_{DIFF}$(j, i)<0).

In step S5 of FIG. 25, firstly, demosaicing processing of the image I(j, i) is performed, and the image I(j, i) is transformed to the L*a*b* color space to generate lightness L*(j, i) and chromaticity a*(j, i), b*(j, i) indicative of hue and the saturation.

Next, in step 35 of FIG. 25, a third intensity parameter $0 \leq k_{ab} < 1$ is set to assign the intensity of the saturation modification processing with respect to the image I(j, i).

In step S5 of FIG. 25, finally, the processing for emphasizing the saturation or the processing for reducing the saturation is performed with respect to the chromaticity a*(j, i), b*(j, i) in accordance with the image shift difference amount distribution $M_F$F(j, i) to generate an output image L*(j, i), Ma*(j, i), Mb*(j, i), by a formula (19A) and a formula (19B).

[Formula 19]

$$Ma^*(j,i) = \max(1 + k_{ab} \times M_{DIFF}(j,i), 0) \times a^*(j,i), \quad (19A)$$

$$Mb^*(j,i) = \max(1 + k_{ab} \times M_{DIFF}(j,i), 0) \times b^*(j,i), \quad (19B)$$

By the above exemplary processing, the main object is more highlighted by reducing the saturation in the blurred area, and emphasizing the saturation of the main object at the in-focus, if it is set as "the predetermined image shift amount p=0".

In an embodiment of the present invention, the exemplary processing for modifying the saturation is illustrated in accordance with the image shift difference amount distribution $M_{DIFF}$(j, i). However, the present invention is not limited to this processing, and also, the saturation may be modified in accordance with the contrast distribution $M_{CON}$(j, i), or the saturation may be modified in accordance with the image shift amount distribution $M_{DIS}$(j, i).

To relatively reduce the saturation of a distant view to emphasize the perspective sensation, the processing for reducing the saturation may be performed in the relatively distant area in which the image shift amount distribution $M_{DIS}$(j, i) is smaller than a predetermined image shift amount p. Also, the processing for emphasizing the saturation may be performed in the relatively front area in which the image shift amount distribution $M_{DIS}$(j, i) is larger than the predetermined image shift amount p.

In contrast, to increase the saturation of the distant view relatively to highlight the compression effect by a telephoto lens, the processing for emphasizing the saturation may be performed in the relatively distant area in which the image shift amount distribution $M_{DIS}$(j, i) is smaller than the predetermined image shift amount p. Also, the processing for reducing the saturation may be performed in the relatively front area in which the image shift amount distribution $M_{DIS}$(j, i) is larger than the predetermined image shift amount p.

As described above, the image processing method in an embodiment of the present invention is an image processing method for generating an output image from an input image acquired by an imaging element in which a plurality of pixels provided with a plurality of photoelectric conversion units for receiving light flux passing through different partial pupil areas in a focusing optical system are arrayed, the method comprising: generating a plurality of viewpoint images for every area of the different partial pupil areas, from the input image; generating an captured image in accordance with a pupil area in which the different partial pupil areas are synthesized, from the input image; generating a contrast distribution from the captured image and the plurality of viewpoint images; generating image shift amount distribution from the plurality of viewpoint images; and generating the output image by performing image processing for modifying saturation with respect to the captured image, in accordance with the contrast distribution and the image shift amount distribution.

The configuration of an embodiment of the present invention can perform the image processing for modifying the saturation, while successfully maintaining the quality of the image.

Third Embodiment

Next, a description will be given of a third embodiment of the present invention. In the third embodiment, the same elements as those in the first embodiment are designated by the same reference numerals and the detail description thereof will be omitted, and the difference therebetween is mainly described.

FIG. 26 illustrates a schematic diagram of an array of a pixel and a sub pixel of an imaging element in an embodiment of the present invention. The left-right direction in FIG. 26 is set as the x direction (horizontal direction), and the y direction is set in the vertical direction (perpendicular direction), and the z direction (optical axis direction) is set in a direction perpendicular to both of the x direction and the y direction (a direction perpendicular to the plane of the page). FIG. 26 illustrates a pixel array (imaging pixel) of a two-dimensional CMOS sensor (imaging element) in an embodiment of the present invention illustrated as a 4-column by 4-row range and a sub pixel array illustrated as 8-column by 8-row range.

In an embodiment of the present invention, in a 2-column by 2-row pixel group 200 illustrated in FIG. 26, a pixel 200R with spectral sensitivity of a first color R (red) is arrayed at the position in the upper left, a pixel 200G with spectral sensitivity of a second color G (green) is arrayed in the upper right and the lower left, and a pixel 200B with spectral sensitivity of a third color (blue) is arrayed in the lower right. Furthermore, each pixel is comprised of a plurality of sub pixels, including a first sub pixel 201 to a fourth sub pixel 204 (the first sub pixel to the $N_{LF}$th sub pixel), that are divided as the two parts in the x direction (Nx division), and two parts in the y direction (Ny division), wherein the division number is 4 (the division number $N_{LF}$=Nx×Ny).

In an exemplary configuration illustrated in FIG. 26, a plurality of pixels each of which is in 4-column by 4-row range (the sub-pixel in 8-column by 8-row range) is arrayed in the surface such that an input image for generating an image and a plurality of viewpoint images wherein the divided number is 4 ($N_{LF}$) can be acquired. In the imaging element in an embodiment of the present invention, a cycle of pixel P is set as 4 μm (micrometer), the number of the pixel N is set in 5,575-column by 3,725-row range=about 20,750,000 pixels. Also, the cycle of the sub pixel $P_s$ is set as 2 μm and the number of the sub pixel $N_s$ is set in 11,150-column by 7,450-row range=about 83,000,000 pixels.

FIG. 27A illustrates the single pixel 200G in the imaging element as illustrated in FIG. 26, in a plan view as viewed from the light-receiving surface side (+z side) of the imaging element. The z-axis is set in a direction vertical to the plane of the page of FIG. 27A, and the near side is defined as the forward direction of the z axis. Also, the y-axis is set in a vertical direction perpendicular to the z-axis, the upper side is set as the forward direction of the y-axis, and the x-axis is set in the left-right direction perpendicular to both of the z-axis and the y-axis, and the right side is set as the forward direction of the x-axis. FIG. 27B illustrates a cross sectional diagram along an a-a cutting-plane line as viewed from the −y side of FIG. 27A.

As illustrated in FIGS. 27A and 27B, in the pixel 200G, a microlens 305 for converging the incident light at a light receiving surface side of each pixel (+z direction) is formed. In addition, a plurality of photoelectric conversion units comprised of a first photoelectric conversion unit 301 to a fourth photoelectric conversion unit 304 (the first photoelectric conversion unit to the $N_{LF}$th photoelectric conversion unit) that are divided as two parts in the x direction (Nx division) and two parts in the y direction (Ny division), wherein the divided number is 4 ($N_{LF}$), are formed. The first photoelectric conversion unit 301 to the fourth photoelectric conversion unit 304 (the first photoelectric conversion unit to the $N_{LF}$th photoelectric conversion unit) respectively correspond to the first sub pixel 201 to the fourth sub pixel 204 (the first sub pixel to the $N_{LF}$th sub pixel).

[Multi-Viewpoint Image and Image of Third Embodiment]

In step S1 in FIG. 9, a plurality of viewpoint images is generated in every area of different partial pupil areas in the focusing optical system, based on the LF data (input image) acquired by the imaging element of an embodiment of the present invention, and subsequently, an image is generated in accordance with the pupil area in which the different partial pupil areas in the focusing optical system are synthesized.

In step S1, firstly, the LF data (input image) acquired by the imaging element of an embodiment of the present invention is input. Alternatively, the LF data (input image) previously photographed by the imaging element of an embodiment of the present invention and stored in a storage medium may be used.

Next, in step S1, the first sub pixel 201 to the fourth sub pixel 204 (the first viewpoint image to the $N_{LF}$th viewpoint image) are generated in every area of the different partial pupil areas in the focusing optical system. The LF data (input image) is set as "LF". Also, a sub pixel signal which is the $i_s$th ($1 \leq i_s \leq Nx$) in the column direction and the $J_s$th ($1 \cdot j_s \leq Ny$) in the row direction in each pixel signal of the LF is set as "k=Nx ($j_S−1$)+$i_S$($1 \leq k \leq N_{LF}$)" and the kth sub pixel signal. The kth viewpoint image Ik(j, i), which is the ith in the column direction and the jth in the row direction and corresponds to the kth partial pupil area in the focusing optical system, is generated by the formula (1).

An embodiment of the present invention is an exemplary configuration divided into four parts, wherein Nx=2, Ny=2, $N_{LF}$=4. A signal from the certain sub pixel among the first sub pixel 201 to the fourth sub pixel 204 divided as the four parts (the first sub pixel to the $N_{LF}$th sub pixel which are divided as Nx×Ny) is selected for each pixel from the LF data (input image) corresponding to the pixel array illustrated in FIG. 26, thereby generating a first viewpoint image to a fourth viewpoint image (the first viewpoint image to the $N_{LF}$th viewpoint image) that are RGB signals of the Bayer arrangement having a resolution corresponding to the number of pixels N and corresponding to the certain partial pupil area among the first partial pupil area to a fourth partial pupil area (the first partial pupil area to the $N_{LF}$th partial pupil area) in the focusing optical system.

Next, in step S9 of FIG. 9, the image is generated in accordance with the pupil area in which the different partial pupil areas in the focusing optical system are synthesized. The image I(j, i) that is the ith in the column direction and the jth in the row direction is generated by the formula (2).

An embodiment of the present invention is an exemplary configuration divided into four parts, wherein Nx=2, Ny=2, $N_{LF}$=4. All of the signals derived from the first sub pixel 201 to the fourth sub pixel 204 divided as the four parts (the first sub pixel to the $N_{LF}$th sub pixel which are divided as Nx×Ny) are generated for each pixel, from the input image (LF data) corresponding to the pixel array illustrated in FIG. 26, thereby generating an image that is a RGB signal of the Bayer arrangement having a resolution corresponding to the number of pixels N.

[Contrast Distribution of Third Embodiment]

In step S2 of FIG. 9, contrast distribution is generated by extracting a high-frequency band component of a space frequency for every area, from the image and the plurality of viewpoint images in an embodiment of the present invention respectively. The contrast distribution in an embodiment of the present invention is adjusted in accordance with the difference between the viewpoint images.

In step S2, firstly, from the image I (j, i) that is the RGB signal of the Bayer arrangement, the color gravity of each color RGB is matched at every position (j, i), and then an image brightness signal Y is generated by the formula (3A). Also, from the kth viewpoint image Ik (k=1 to $N_{LF}$) that is the RGB signal of the Bayer arrangement, the kth viewpoint brightness signal Yk is generated by the formula (3B).

Next, in step S2, by using the formula (4A), an imaging high-frequency signal dY(j, i) is generated from the image brightness signal Y(j, i) by using a two-dimensional band pass filter for extracting the high-frequency component of the space frequency $\{F_{BPF}(j_{BPF}, i_{BPF})|-n_{BPF} \leq j_{BPF} \leq n_{BPF}, -m_{BPF} \leq i_{BPF} \leq m_{BPF}\}$. Also, from the kth viewpoint brightness signal Yk(j, i) (k=1 to $N_{LF}$), the kth viewpoint high-frequency signal dYk(j, i) is generated by the formula (4B).

An embodiment of the present invention is an exemplary configuration divided into four parts, wherein Nx=2, Ny=1, $N_{LF}$=2, in which the two-dimensional band pass filter is constituted as $F_{BPF}(j_{BPF}, i_{BPF})=Fy(j_{BPF}) \times Fx(i_{BPF})$ by the direct product of a one-dimensional filter $Fx(i_{BFF})$ in the x direction (pupil division direction) and a one-dimensional filter Fy ($j_{BPF}$) in the y direction (direction perpendicular to the pupil division direction). In the one dimensional filter $Fx(i_{BPF})$ in the x direction that is one of the pupil division directions, a one-dimensional band pass filter such as, for example, 0.5×[1, 2, 0, −2, −1]+1.5×[1, 0, −2, 0, 1] can be used to extract the high-frequency component of the space frequency in the x direction. Also, in the one-dimensional filter Fy($j_{BPF}$) in y direction that is one of the pupil division directions, a one-dimensional band pass filter such as, for example, 0.5×[1, 2, 0, −2, −1]+1.5×[1, 0, −2, 0, 1], can be used to extract the high frequency component of the space frequency in the y direction. An embodiment of the present invention illustrates the two-dimensional band pass filter configured by the direct product of the two one-dimensional filters, however, the present embodiment does not intend to limit the present invention, and the general two-dimensional band pass filter can be used.

Next, in step S2, the imaging high-frequency signal dY(j, i) is normalized by the image brightness signal Y(j, i), wherein $Y_0>0$, to generate a normalized imaging high-frequency signal $dZ(j, i)$ by the formula 5(A). Also, the kth viewpoint high-frequency signal $dYk(j, i)$ (k=1 to $N_{LF}$) is normalized by the kth viewpoint brightness signal $Yk(j, i)$ to generate a normalized kth viewpoint high-frequency signal $dZk(j, i)$ by the formula (5B). Determination of the maximum as "$Y_0>0$" in the denominator is to prevent the division by "0". As necessary, prior to the normalization in the formula 5(A) and the formula 5(B), the high-frequency cut (low-pass) filter processing may be performed with respect to the image brightness signal $Y(j, i)$ and the kth viewpoint brightness signal $Yk(j, i)$ to suppress the high-frequency noise.

Next, in step S2, image contrast distribution $C(j, i)$ is generated by the formula (6A) as a low brightness threshold that is denoted by "Ymin", a contrast maximum threshold that is denoted by "Cmax", and an exponent that is denoted by "γ". In the first line of the formula (6A), if the image brightness signal $Y(j, i)$ is smaller than the low brightness threshold Ymin, the value of the image contrast distribution $C(j, i)$ is set as 0. In the third line of the formula (6A), if the normalized imaging high-frequency signal $dZ(j, i)$ is larger than the contrast maximum threshold Cmax, the value of the image contrast distribution $C(j, i)$ is set as 1. In other cases, in the second line of the formula (6A), the image contrast distribution $C(j, i)$ is set as a value for normalizing the normalized imaging high-frequency signal $dZ(j, i)$ with the contrast maximum threshold Cmax and raising to the γth power. As described above, the image contrast distribution $C(j, i)$ is set as a value within the range of [0, 1] (greater than or equal to 0 and less than or equal to 1). It is illustrated that the contrast is low if the value of $C(j, i)$ is close to 0, and the contrast is high if the value is close to 1. The value is raised to the γth power to adjust a tone curve from 0 to 1 in the image contrast distribution $C(j, i)$. Preferably, the exponent γ is greater than or equal to 1.5 and less than or equal to 2.5 to allow the change at the low contrast side to be gentle, and allow the change at the high contrast side to be sharp. As necessary, a composed function $F(C(j, i))$ may be set as the image contrast distribution by using a function F from the domain of definition [0, 1] to the domain range [0, 1]:[0, 1]→[0, 1]. Also, the kth viewpoint contrast distribution $Ck(j, i)$ (k=1 to $N_{LF}$) is generated by the formulate (6B).

Next, in an embodiment of the present invention, in step S2, a contrast difference amount distribution $C_{DIFF}(j, i)$ is generated by using the first viewpoint contrast distribution $C_1(j, i)$ to the fourth viewpoint contrast distribution $C_4(j, i)$ to detect a mixed area of a plurality of object images with the different space frequency components by a formula (20). Next, by the formula (7B), the contrast distribution $M_{CON}(j,i)$, in which the mixed area of the plurality of object images with the different space frequency components, is suppressed to be proximate to 0, by multiplying the image contrast distribution $C(j, i)$ by the contrast difference amount distribution $C_{DIFF}(j, i)$.

[Formula 20]

$$C_{DIFF}(j, i) = 1 - \max_{1 \leq k1 < k2 \leq N_{LF}} (|C_{k1}(j, i) - C_{k2}(j, i)|). \quad (20)$$

In the contrast difference amount distribution $C_{DIFF}(j, i)$ with the range of [0, 1], the value is close to 0 in the area with the large contrast difference between the view point images and a lot of mixing of the object images with the different space frequency components, and the value is close to 1 in the area with the small contrast difference between the viewpoint images and less mixing of the object images with the different space frequency. The contrast distribution $M_{CON}(j, i)$ is the distribution multiplying the image contrast distribution $C(j, i)$ by the contrast difference amount distribution $C_{DIFF}(j, i)$, and therefore, it is the distribution in which the value in the mixed area of the plurality of the object images with the different space frequency components is suppressed to be proximate to 0.

Steps from step S3 in FIG. 9 are similar to those in the first embodiment. The configuration in an embodiment of the present invention can perform the image processing for the sharpening and the smoothing, while successfully maintaining the quality of the image. In the photoelectric conversion unit in each pixel unit of the imaging element, an embodiment with a further increased divided number can be performed (for example, division into 9 parts wherein Nx=3, Ny=3, $N_{LF}$=9, division into 16 parts wherein Nx=4, Ny=4, $N_{LF}$=16, or the like).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-047460 filed Mar. 10, 2015, Japanese Patent Application No. 2016-039594 filed Mar. 2, 2016, and Japanese Patent Application No. 2016-045216 filed Mar. 9, 2016, which are hereby incorporated by reference herein in their entirety.

The invention claimed is:

1. An image processing method comprising:
   acquiring a plurality of viewpoint images;
   generating, by a processing unit, distribution information related to an image shift based on (a) differences of contrast between the plurality of viewpoint images and (b) an image shift amount between at least two of the plurality of viewpoint images, wherein the distribution information is generated so that (a) the image shift amount is used in response to the differences of contrast being lower than a threshold and (b) the image shift amount is not used in response to the differences of contrast not being lower than the threshold; and
   outputting or recording the distribution information by the processing unit, wherein the distribution information is output or recorded for performing image processing, and
   wherein at least one of the following conditions is satisfied: (1) the processing unit comprises a processor, and (2) the processing unit comprises a circuit.

2. The image processing method according to claim 1, wherein the distribution information is generated by (a) generating a contrast distribution from the plurality of viewpoint images, the contrast distribution being a distribution of contrast values indicating contrast, the contrast values respectively corresponding to a plurality of regions of the distribution information and (b) obtaining the distribution information based on the contrast distribution.

3. The image processing method according to claim 2, wherein the distribution information is generated by obtaining the image shift amount in a region where the contrast value is equal to or greater than a predetermined value in the contrast distribution and is generated without obtaining the image shift amount in a region where the contrast value is less than the predetermined value.

4. The image processing method according to claim 2, wherein the contrast distribution is a distribution obtained by extracting high frequency components from a composite image corresponding to the plurality of viewpoint images.

5. The image processing method according to claim 2, wherein the contrast distribution is generated according to differences in the high frequency components for each of the plurality of viewpoint images.

6. The image processing method according to claim 2, wherein the contrast distribution is generated by multiplying (a) a difference contrast distribution generated based on a difference between distributions respectively corresponding to the plurality of viewpoint images, the distributions being obtained by extracting the high frequency components and (b) a distribution obtained by extracting the high frequency components from a composite image corresponding to the plurality of viewpoint images.

7. The image processing method according to claim 1, wherein the distribution information is output or recorded in accordance with an image.

8. The image processing method according to claim 1, wherein the distribution information is a distribution of values obtained for a plurality of regions in an image based on the image shift amount between the plurality of viewpoint images for each region.

9. The image processing method according to claim 1, further comprising performing image processing on an image based on the distribution information to generate an output image.

10. The image processing method according to claim 9, wherein the image processing is a sharpening process, a smoothing process, or a combination process thereof.

11. The image processing method according to claim 10, wherein, in a value of the distribution information, the sharpening process as the image processing is performed more strongly in a region where a difference from a reference of the value is small than in a region where a difference from the reference of the value is large.

12. The image processing method according to claim 10, wherein, in a value of the distribution information, the smoothing process as the image processing is performed more strongly in a region where a difference from a reference of the value is large than in a region where a difference from the reference of the value is small.

13. The image processing method according to claim 10, wherein, in a value of the distribution information, a region where a difference from a reference of the value is small is subjected to the sharpening process as the image processing, and a region where a difference from the reference of the value is large is subjected to the smoothing processing as the image processing.

14. The image processing method according to claim 10, wherein the image processing is a process for modifying saturation.

15. The image processing method according to claim 1, wherein the plurality of viewpoint images are generated from an input image acquired by an imaging element in which are arrayed a plurality of pixels provided with a respective plurality of photoelectric conversion units for receiving light flux passing through different partial pupil areas in a focusing optical system.

16. The image processing method according to claim 1, wherein the plurality of viewpoint images are generated from an input image acquired by an imaging element in which are arranged (a) a microlens and (b) a plurality of pixels provided with a respective plurality of photoelectric conversion units corresponding to the microlens.

17. The image processing method according to claim 1, wherein the distribution information is a distribution of the image shift amount or a defocus amount corresponding to each of a plurality of regions of the image.

18. An image processing method comprising:
acquiring, in a case where an imaging element has arranged therein (a) a microlens and (b) a plurality of pixels provided with a respective plurality of photoelectric conversion units corresponding to the microlens, a viewpoint image corresponding to a signal obtained from a part of the plurality of photoelectric conversion units;
acquiring a composite image corresponding to signals obtained from all of the plurality of photoelectric conversion units;
generating, by a processing unit, distribution information related to image shift based on (a) differences of contrast between the viewpoint image and the composite image and (b) an image shift amount between the viewpoint image and an image calculated using the composite image, wherein the distribution information is generated so that (a) the image shift amount is used in response to the differences of contrast being lower than a threshold and (b) the image shift amount is not used in response to the differences of contrast not being lower than the threshold; and
outputting or recording the distribution information by the processing unit, wherein the distribution information is output or recorded for performing image processing, and
wherein at least one of the following conditions is satisfied: (1) the processing unit comprises a processor, and (2) the processing unit comprises a circuit.

19. An image processing device comprising:
a memory that stores a program;
a processor coupled to the memory and configured to execute the program to function as a plurality of units comprising:
(1) an acquiring unit configured to acquire a plurality of viewpoint images;
(2) a generating unit configured to generate distribution information related to an image shift based on (a) differences of contrast between the plurality of viewpoint images and (b) an image shift amount between at least two of the plurality of viewpoint images, wherein the distribution information is generated so that (a) the image shift amount is used in response to the differences of contrast being lower than a threshold and (b) the image shift amount is not used in response to the differences of contrast not being lower than the threshold; and
(3) an outputting unit configured to output or record the distribution information, wherein the distribution information is output or recorded for performing image processing.

20. The image processing device according to claim 19, wherein the generating unit generates the distribution information by (a) generating a contrast distribution from the plurality of viewpoint images, the contrast distribution being a distribution of contrast values indicating contrast, the contrast values respectively corresponding to a plurality of regions of the distribution information and (b) obtaining the distribution information based on the contrast distribution.

21. The image processing device according to claim 20, wherein the distribution information is generated by obtaining the image shift amount in a region where the contrast value is equal to or greater than a predetermined value in the contrast distribution and is generated without obtaining the image shift amount in a region where the contrast value is less than the predetermined value.

22. The image processing device according to claim 20, wherein the contrast distribution is a distribution obtained by extracting high frequency components from a composite image corresponding to the plurality of viewpoint images.

23. The image processing device according to claim 20, wherein the contrast distribution is generated according to differences in the high frequency components for each of the plurality of viewpoint images.

24. The image processing device according to claim 20, wherein the contrast distribution is generated by multiplying (a) a difference contrast distribution generated based on a difference between distributions respectively corresponding to the plurality of viewpoint images, the distributions being obtained by extracting the high frequency components and (b) a distribution obtained by extracting the high frequency components from a composite image corresponding to the plurality of viewpoint images.

25. The image processing device according to claim 19, wherein the outputting unit outputs or records the distribution information in accordance with an image.

26. The image processing device according to claim 19, wherein the distribution information is a distribution of values obtained for a plurality of regions in an image based on the image shift amount between the plurality of viewpoint images for each region.

27. The image processing device according to claim 19, wherein the processor executes the program to function as:
an image processing unit configured to perform image processing on an image based on the distribution information to generate an output image.

28. The image processing device according to claim 27, wherein the image processing unit performs a sharpening process, a smoothing process, or a combination process thereof as the image processing.

29. The image processing device according to claim 28, wherein, in a value of the distribution information, the sharpening process as the image processing is performed more strongly in a region where a difference from a reference of the value is small than in a region where a difference from the reference of the value is large.

30. The image processing device according to claim 28, wherein, in a value of the distribution information, the smoothing process as the image processing is performed more strongly in a region where a difference from a reference of the value is large than in a region where a difference from the reference of the value is small.

31. The image processing device according to claim 28, wherein, in a value of the distribution information, a region where a difference from a reference of the value is small is subjected to the sharpening process as the image processing, and a region where a difference from the reference of the value is large is subjected to the smoothing processing as the image processing.

32. The image processing device according to claim 28, wherein the image processing is a process for modifying saturation.

33. The image processing device according to claim 19, wherein the plurality of viewpoint images are generated from an input image acquired by an imaging element in which are arrayed a plurality of pixels provided with a respective plurality of photoelectric conversion units for receiving light flux passing through different partial pupil areas in a focusing optical system.

34. The image processing device according to claim 19, wherein the plurality of viewpoint images are generated from an input image acquired by an imaging element in which are arranged (a) a microlens and (b) a plurality of pixels provided with a respective plurality of photoelectric conversion units corresponding to the microlens.

35. The image processing device according to claim 19, wherein the distribution information is a distribution of the image shift amount or a defocus amount corresponding to each of a plurality of regions of the image.

36. A camera comprising: (1) an imaging element including (a) a microlens and (b) an image sensor including a photoelectric conversion unit, the photoelectric conversion unit being configured to receive light passing through the microlens, and (2) the image processing device according to claim 19.

37. A camera according to claim 36, further comprising a lens barrel, a lens group that is configured to move in accordance with a focus detection result, an optical low-pass filter, and an aperture shutter.

38. An image processing device comprising:
an imaging element in which are arranged a plurality of pixels provided with (a) a microlens and (b) a plurality of photoelectric conversion units corresponding to the microlens;
a memory that stores a program; and
a processor coupled to the memory and configured to execute the program to function as a plurality of units comprising:
(1) an acquiring unit configured to acquire a viewpoint image corresponding to a signal obtained from a part of the plurality of photoelectric conversion units captured by the imaging element and to acquire a composite image corresponding to signals obtained from all of the plurality of photoelectric conversion units;
(2) a generating unit configured to generate distribution information related to image shift based on (a) differences of contrast between the viewpoint image and the composite image and (b) an image shift amount between the viewpoint image and an image calculated using the composite image, wherein the distribution information is generated so that (a) the image shift amount is used in response to the differences of contrast being lower than a threshold and (b) the image shift amount is not used in response to the differences of contrast not being lower than the threshold; and
(3) an outputting unit configured to output or record the distribution information, wherein the distribution information is output or recorded for performing image processing.

39. An image processing method comprising:
acquiring a plurality of viewpoint images;
automatically generating, by a processing unit, distribution information related to an image shift based on (a) differences of contrast between the plurality of viewpoint images and (b) an image shift amount between at least two of the plurality of viewpoint images, wherein the distribution information is generated so that (a) the image shift amount is used in response to the differences of contrast being lower than a threshold and (b) the image shift amount is not used in response to the differences of contrast not being lower than the threshold; and
outputting or recording the distribution information by the processing unit,
wherein the distribution information is output or recorded for performing processing using the distribution information, and wherein at least one of the following conditions is satisfied: (1) the processing unit comprises a processor, and (2) the processing unit comprises a circuit.

* * * * *